Figure 1:
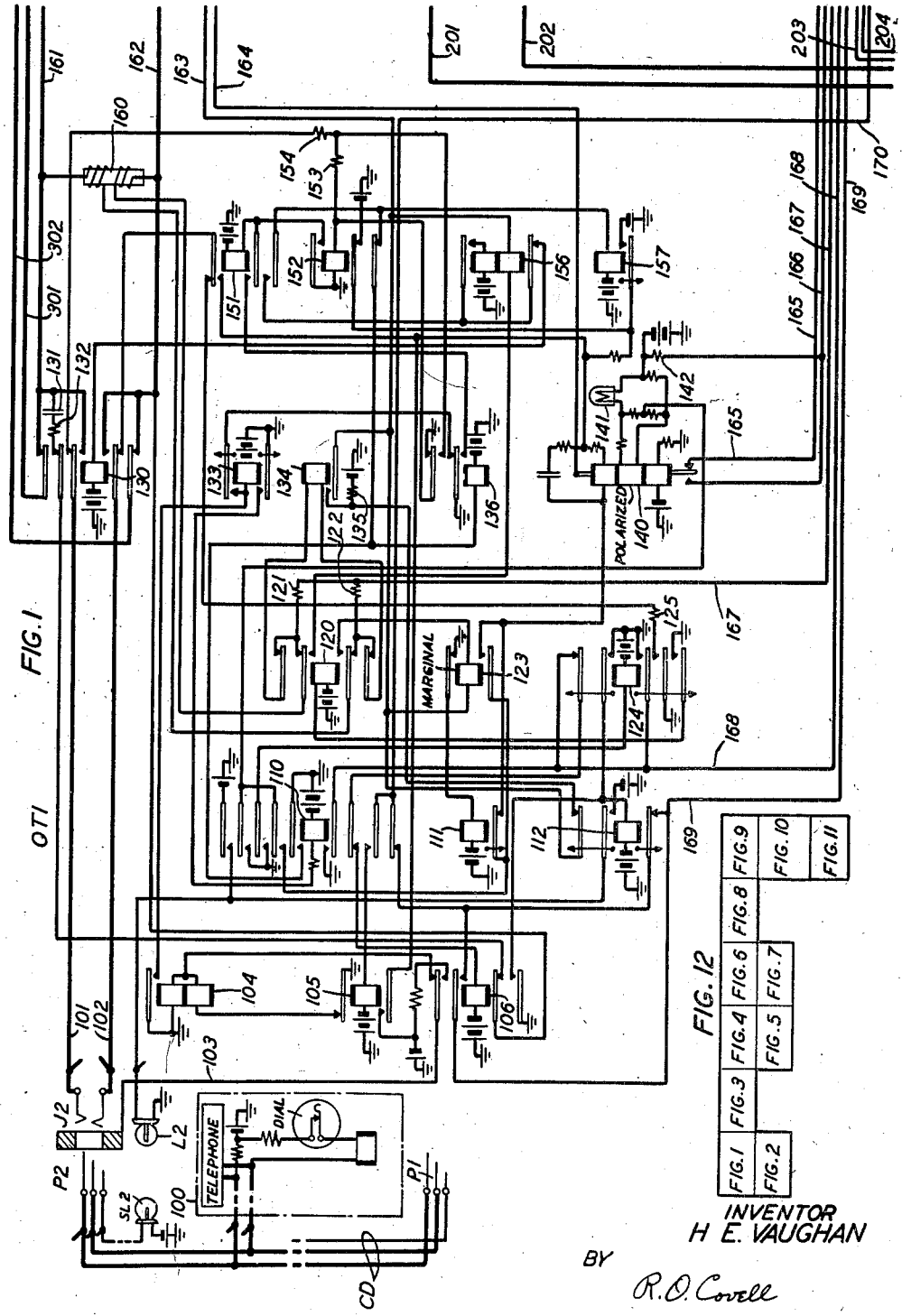

Jan. 4, 1944.   H. E. VAUGHAN   2,338,216
SIGNALING SYSTEM
Filed July 1, 1942   11 Sheets-Sheet 2

INVENTOR
H. E. VAUGHAN
BY
R. O. Covell
ATTORNEY

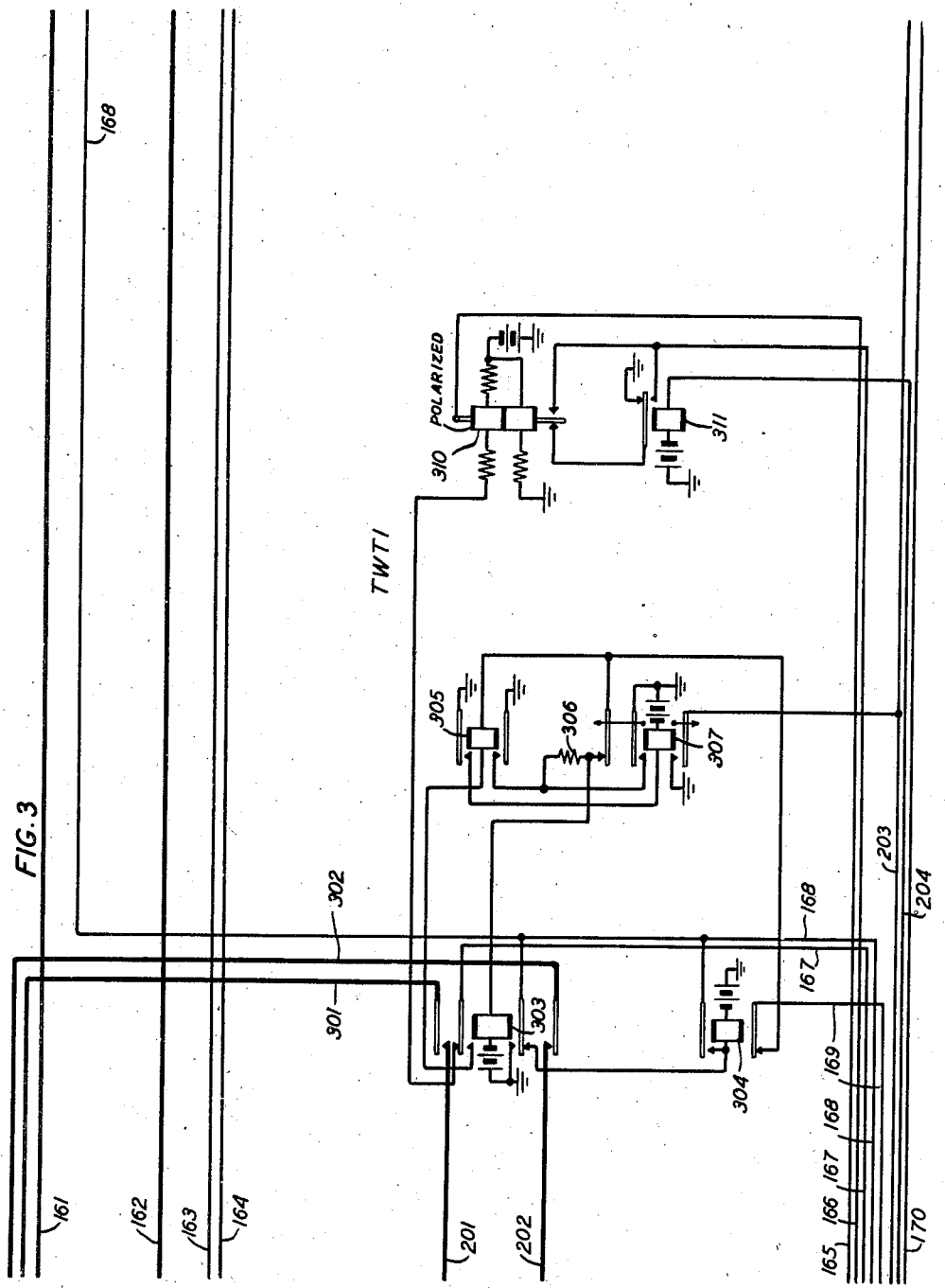

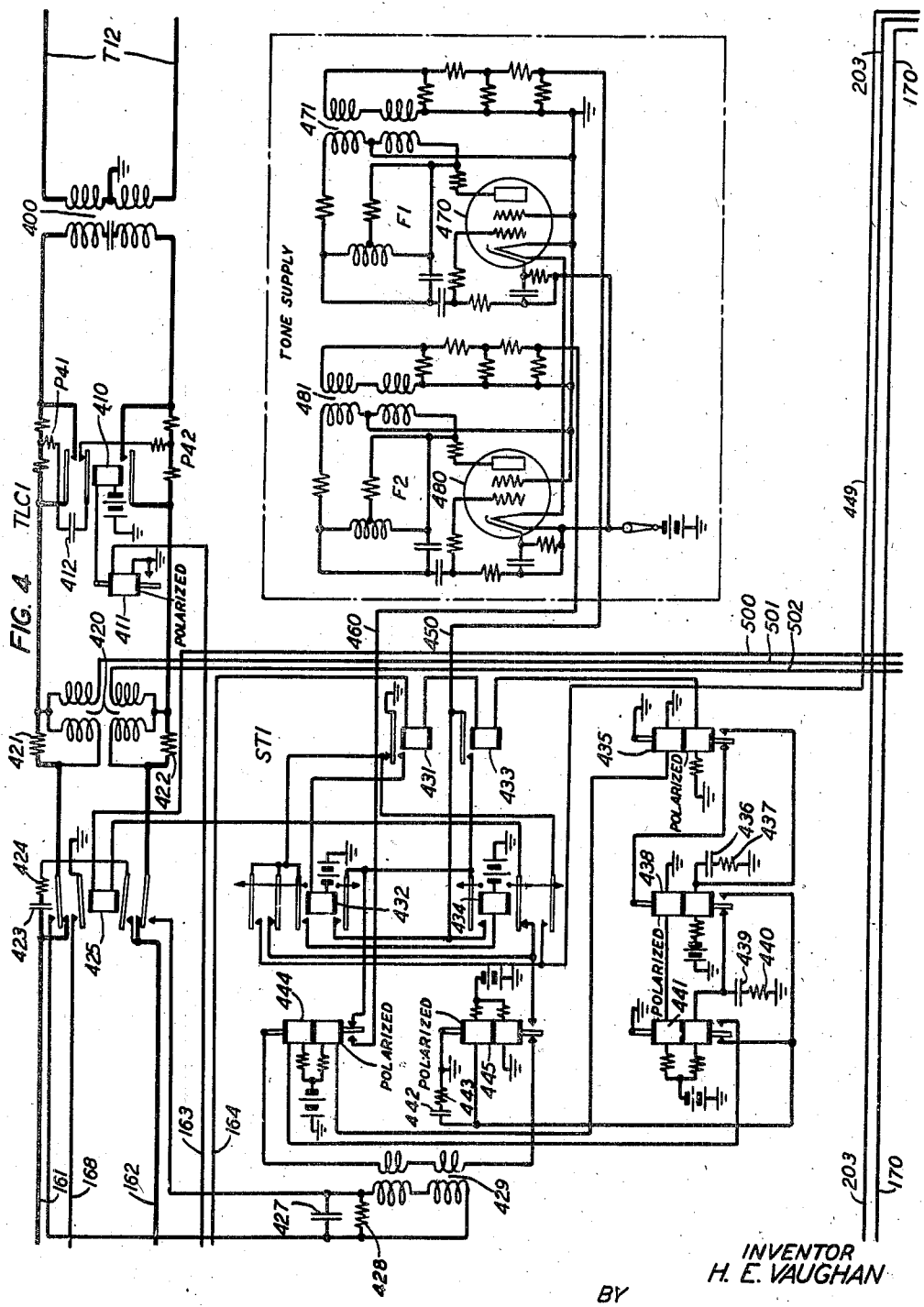

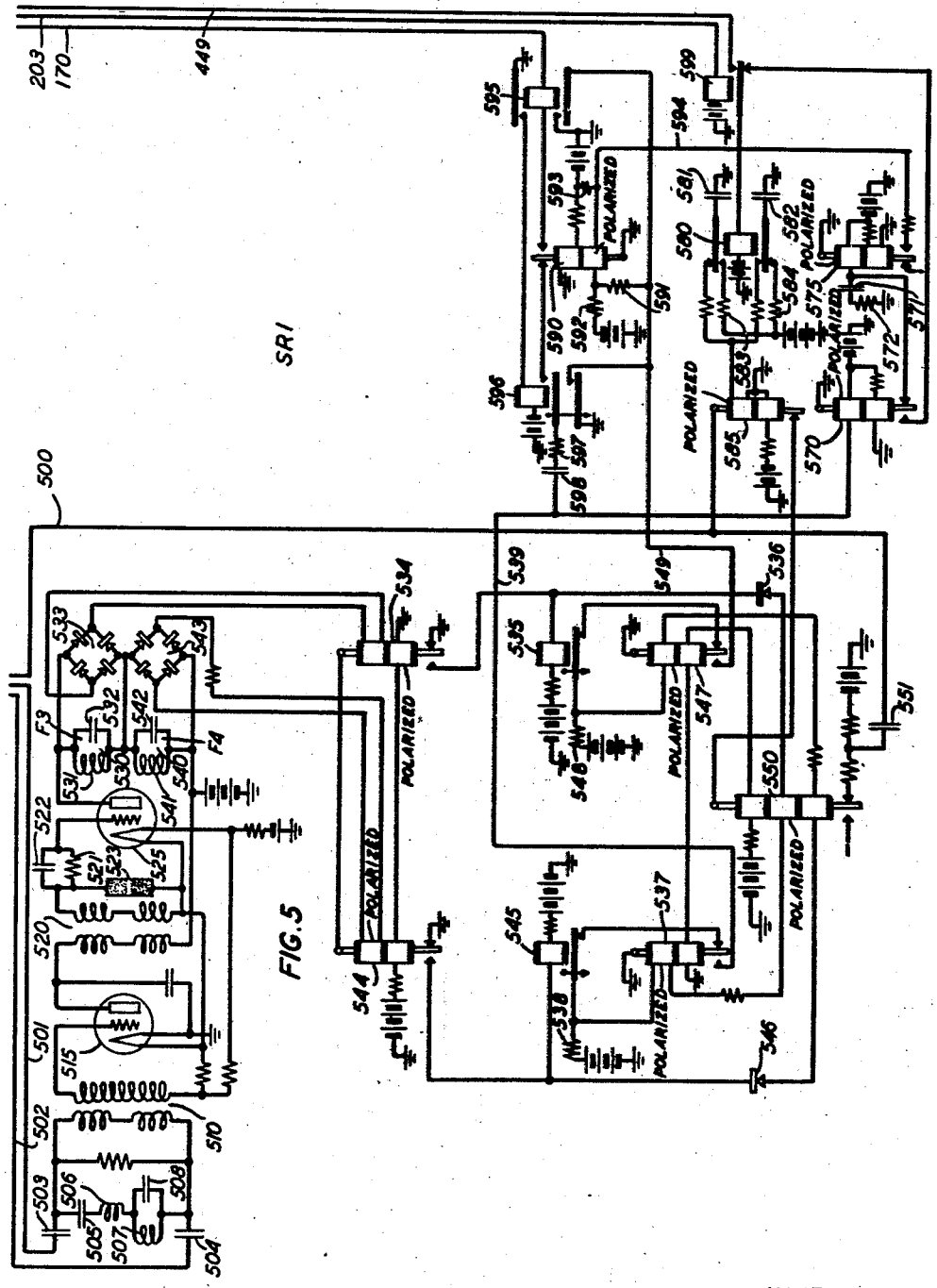

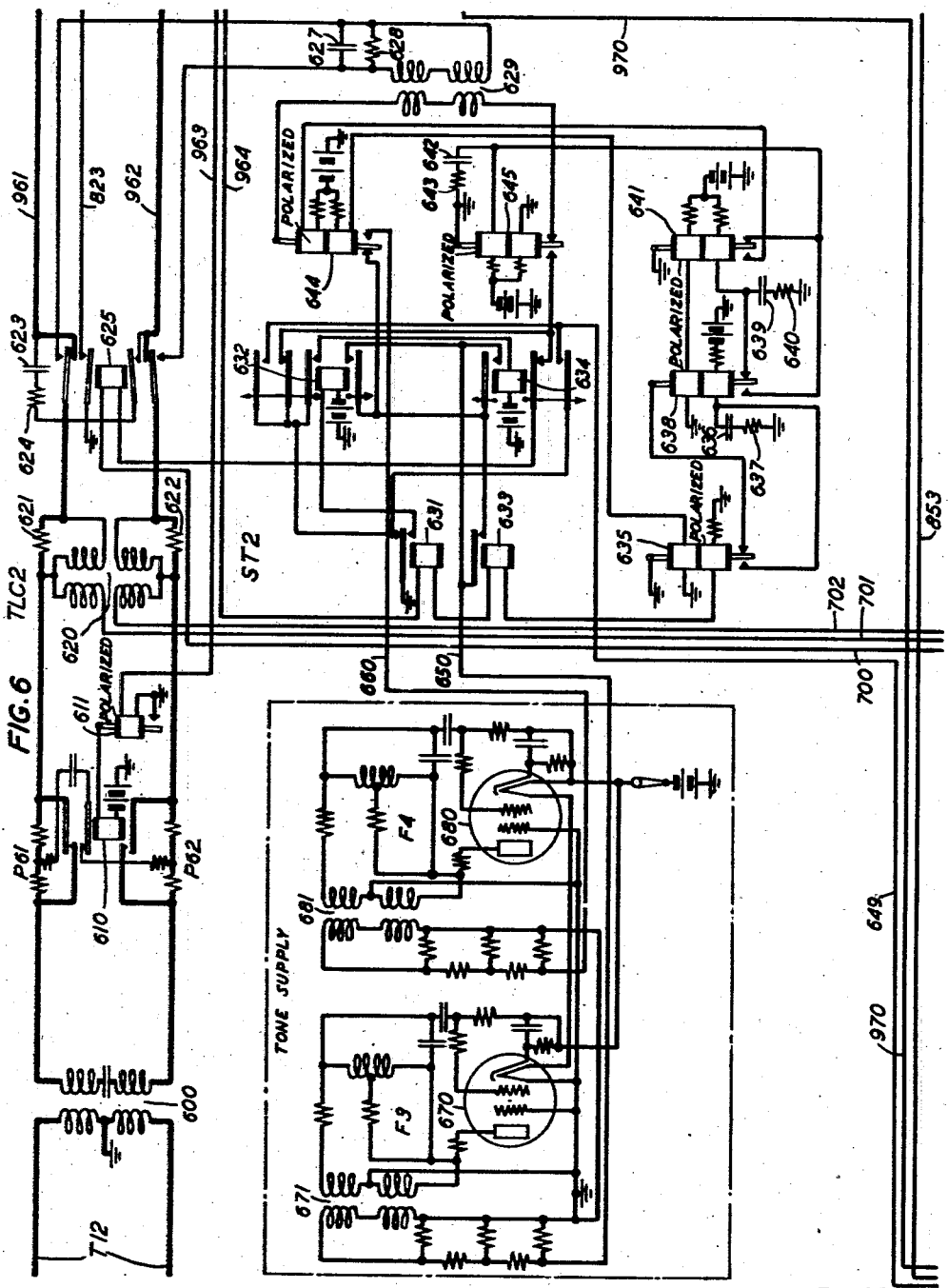

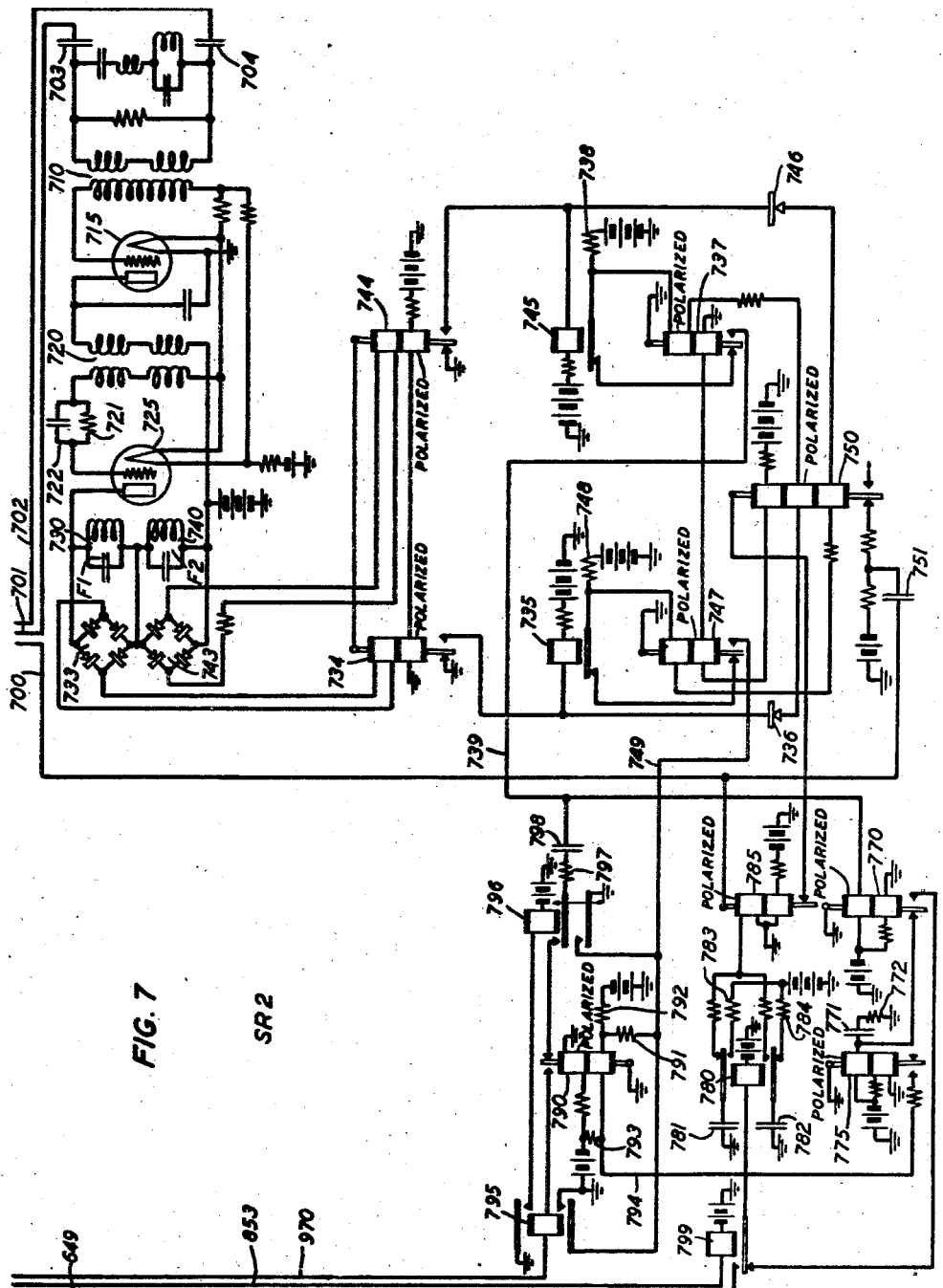

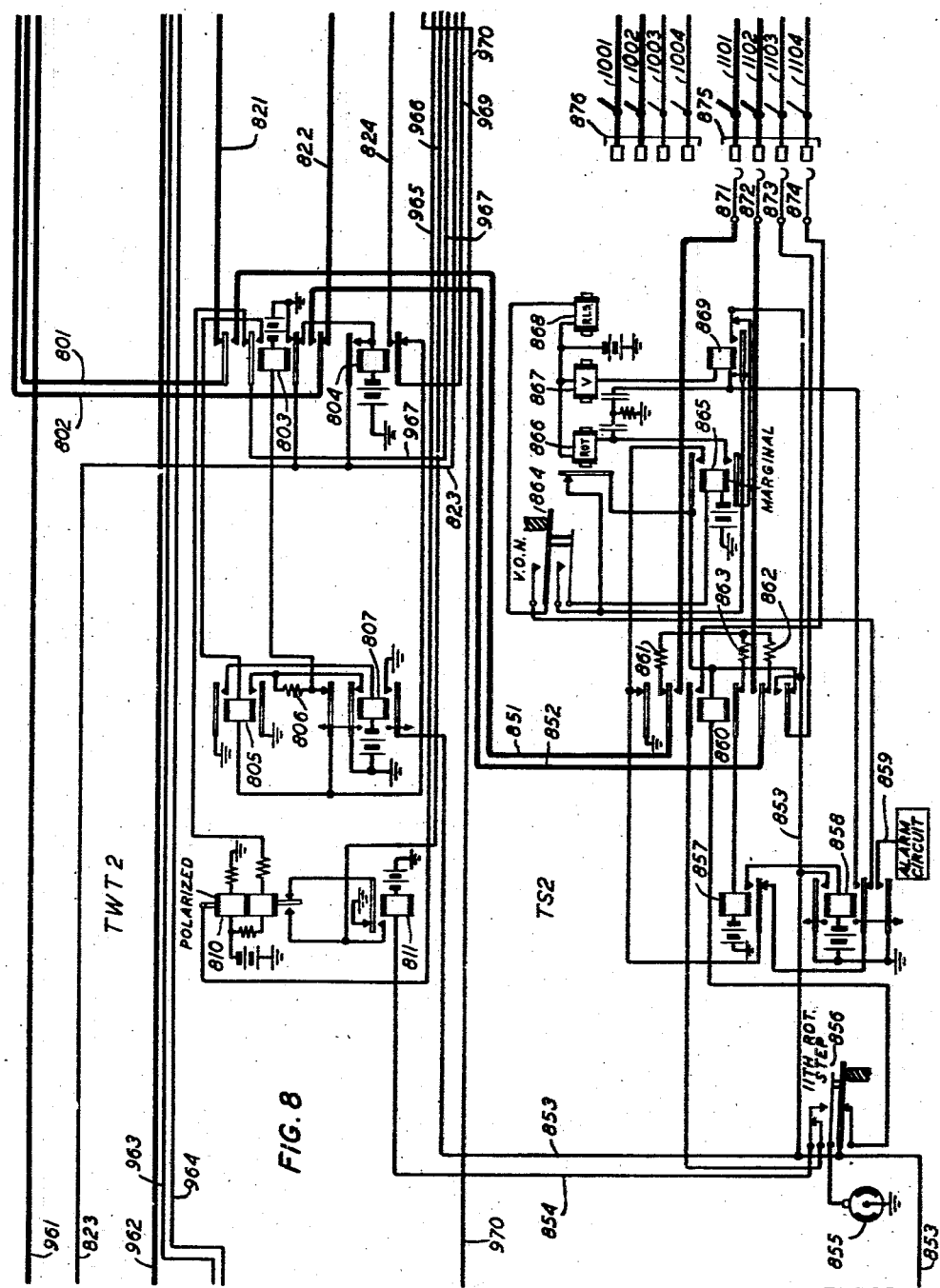

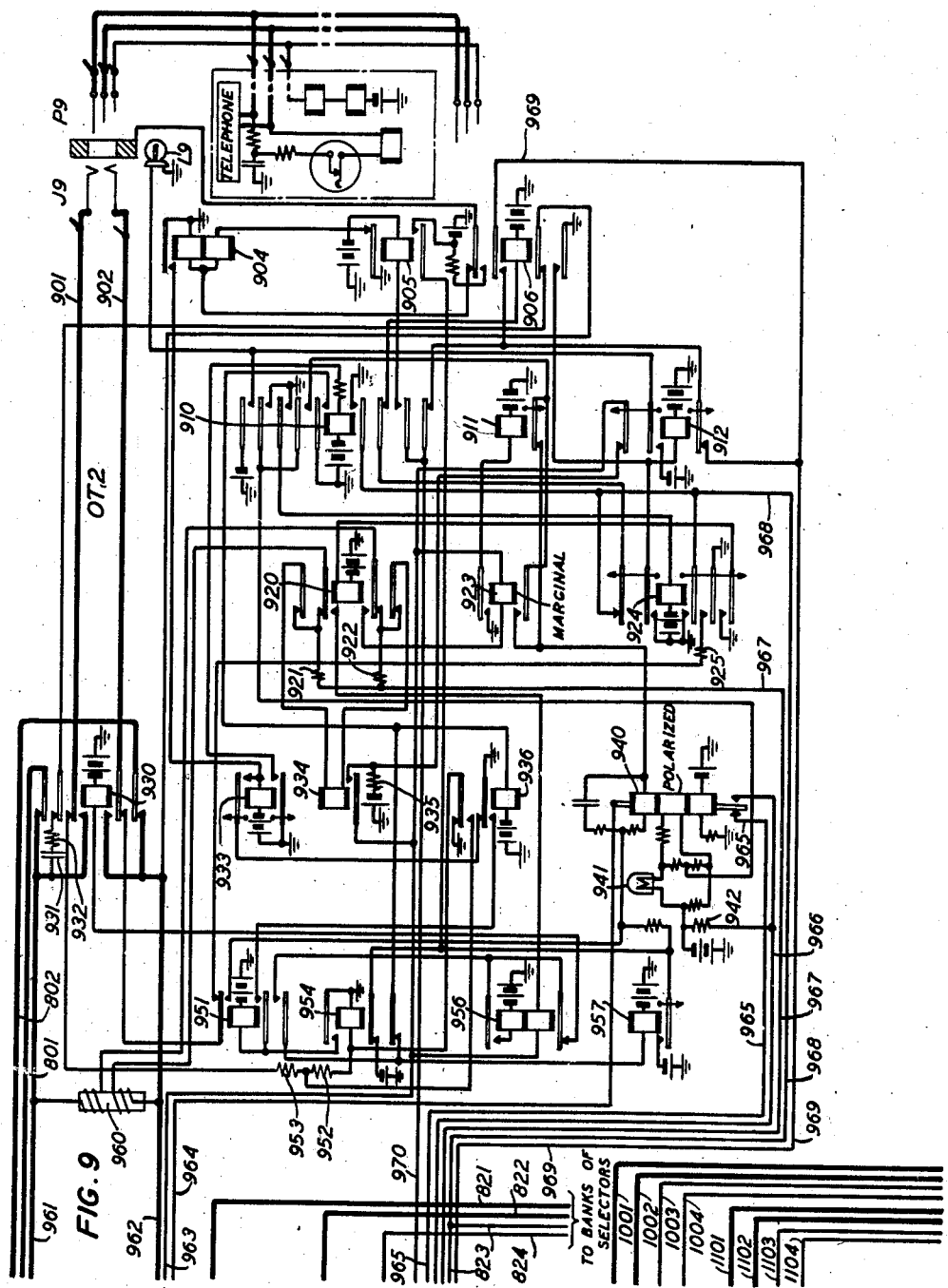
Jan. 4, 1944.  H. E. VAUGHAN  2,338,216
SIGNALING SYSTEM
Filed July 1, 1942  11 Sheets-Sheet 9
INVENTOR
H. E. VAUGHAN
BY
R. O. Covell
ATTORNEY

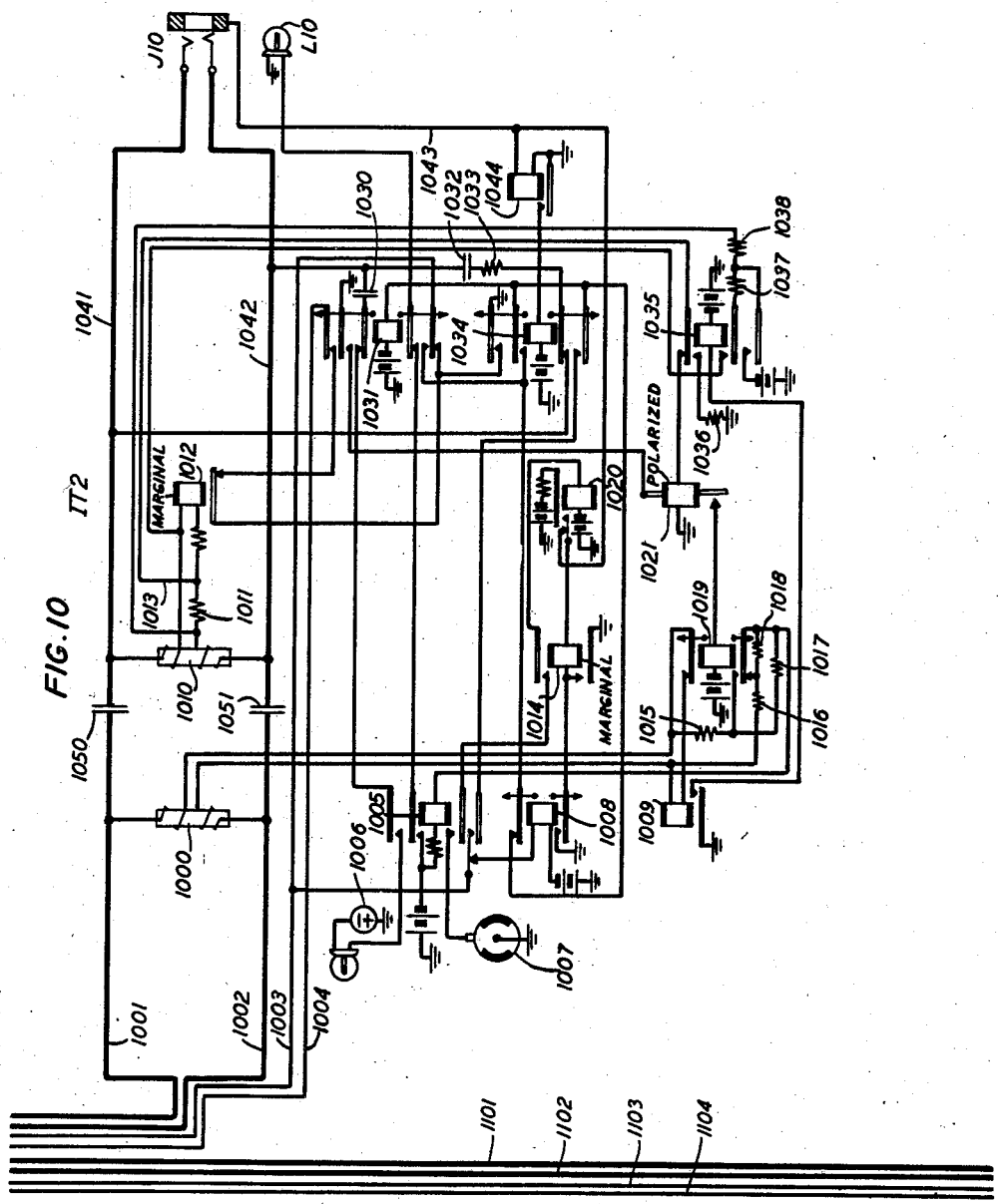

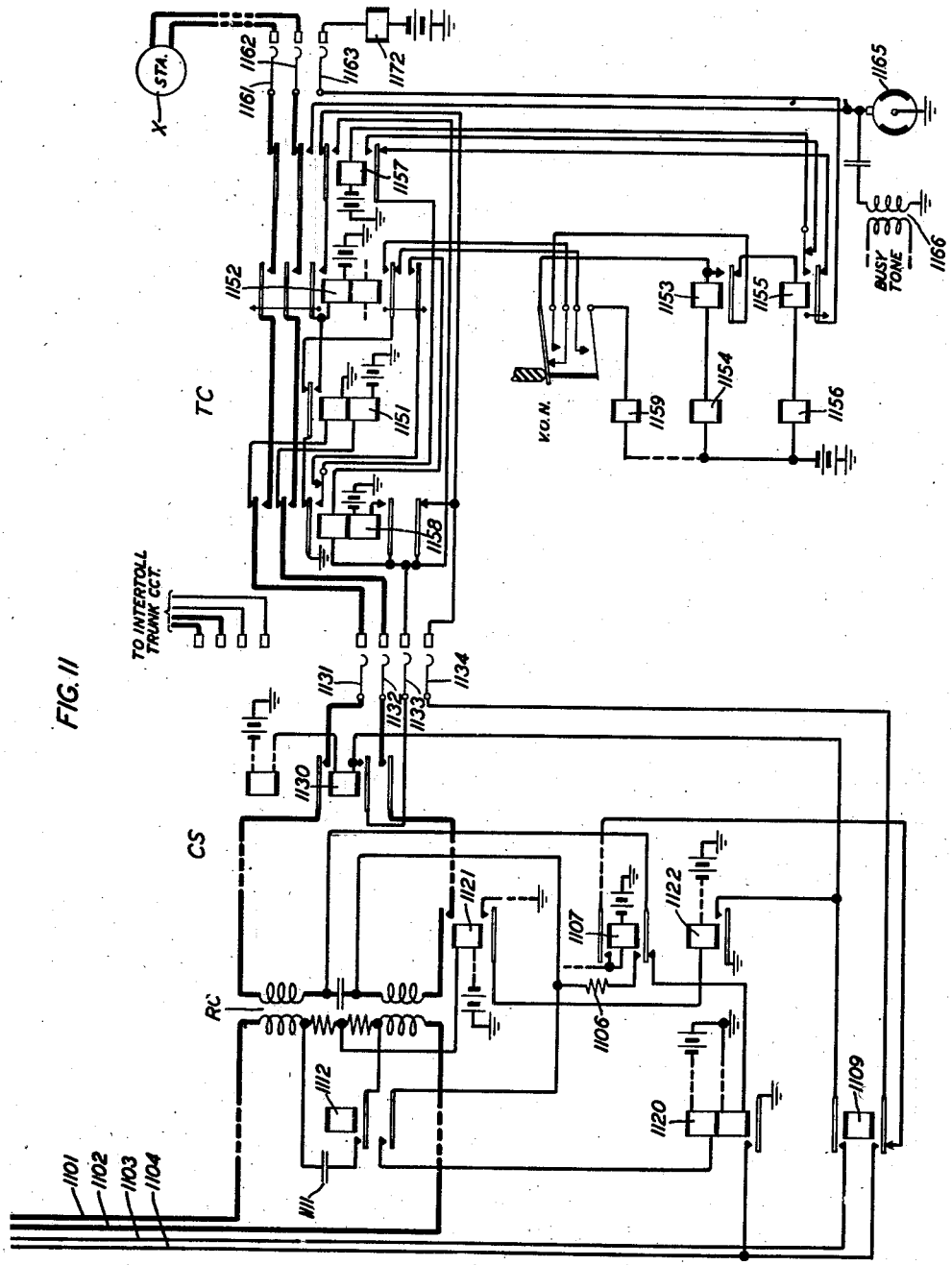

Patented Jan. 4, 1944

2,338,216

UNITED STATES PATENT OFFICE 2,338,216

SIGNALING SYSTEM

Henry E. Vaughan, Valley Stream, N. Y., assignor to Bell Telephone Laboratories, Incorporated, New York, N. Y., a corporation of New York Application July 1, 1942, Serial No. 449,273

7 Claims. (Cl. 179—84)

This invention relates to signaling systems and particularly to telephone systems in which voice frequency signaling currents are employed.

Objects of the invention are the provision of more reliable signal transmitting and receiving means in systems employing voice frequency signaling and the prevention of false operation in response to voice currents or other interfering currents.

This invention is a signaling system comprising means for transmitting signals comprising current of a first frequency followed by current of a second frequency or for transmitting signals comprising current of the second frequency followed by current of the first frequency, and means for responding to such signals without responding to voice currents or other interfering currents. Similar transmitting and receiving means are connected to both ends of a toll telephone line, different frequencies being used for signaling in each direction thereover. Means are provided for opening the talking connection over the associated toll telephone line whenever signals are being transmitted or received thereover, the connection opening means being nonresponsive to voice currents or other interfering currents having a signaling frequency component.

A feature of the invention is the provision of means in a signaling system of the aforementioned character for holding open the talking connection between the toll line and the associated toll route selector, through which an incoming call is extended, while line-busy or all-trunks-busy flashing signals are being transmitted over the toll line, thereby to prevent the alternate opening and closing of a direct current supervisory circuit either alone or in combination with a superimposed busy tone from interfering with the operation of the associated signal receiver in response to a disconnect signal which is being received from the calling toll office at the same time that the busy signal is being transmitted to the calling office.

A clear and complete understanding of the invention will be facilitated by considering a system embodying the invention and its features, one such system being represented schematically in the drawings which form a part of this specification. The invention is not limited in its application to the particular system and circuit arrangements shown in the drawings but is applicable generally to any voice frequency signaling system.

Figure 2:
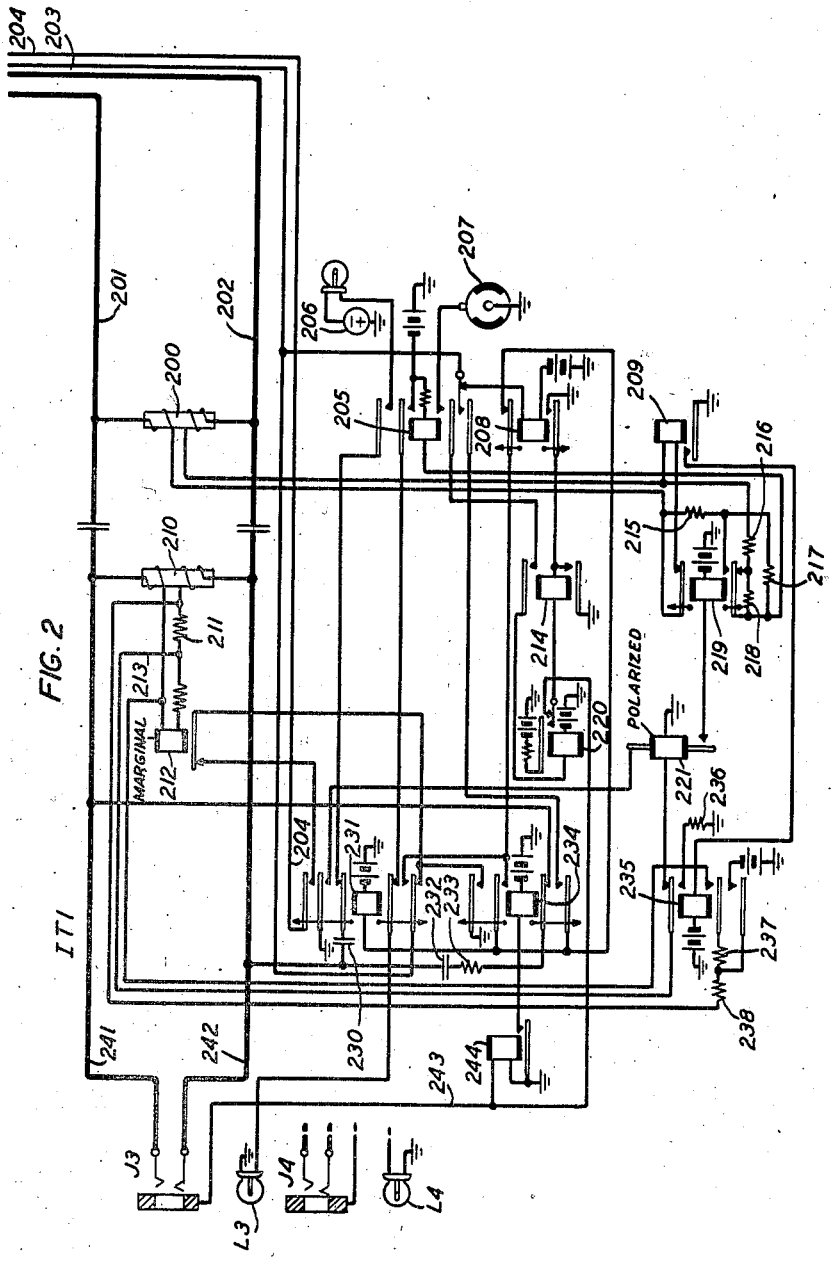

Referring to the drawings:

Figs. 1 to 5, inclusive, represent a first toll office comprising an operator's position, an outgoing trunk circuit OT1, an incoming trunk circuit IT1, a two-way trunk circuit TWT1, a toll line circuit TLC1, a signal transmitting circuit ST1 and a signal receiving circuit SR1;

Figs. 6 to 10, inclusive, represent another toll office comprising toll line circuit TLC2, signal transmitting circuit ST2, signal receiving circuit SR2, two-way trunk circuit TWT2, outgoing trunk circuit OT2, toll route selector TS2, and incoming trunk circuit IT2;

Fig. 11 shows a combined intertoll and toll transmission selector CS in the second toll office and a toll connector TC in a local step-by-step dial office; and Fig. 12 shows the relative position of Figs. 1 to 11, inclusive, to form an operative arrangement.

Reference may be had to the patent to R. E. King et al., No. 2,209,777, granted July 30, 1940, for a detailed disclosure of the cord and operator's position circuits provided in each of the two toll offices for interconnecting calling and called lines and trunks and controlling the completion of toll calls. The outgoing trunk circuits OT1 and OT2, incoming trunk circuits IT1 and IT2, the two-way trunk circuits TWT1 and TWT2, and the toll route selector circuit TS2 are all similar to corresponding circuits in the aforementioned King et al. patent. The intertoll and toll transmission selector CS, shown in part in Fig. 11, is similar to that disclosed in the application of P. W. Wadsworth, Serial No. 384,238, filed March 20, 1941. The toll connector TC, shown in part in Fig. 11, is similar to the connector TC disclosed in the patent to E. D. Butz, No. 2,021,286, granted November 19, 1935.

The toll line circuits TLC1 and TLC2, and the associated signal transmitting and receiving circuits ST1 and ST2, and SR1 and SR2, are arranged for voice frequency signaling over the associated toll lines; whereas in the aforementioned King et al. patent, composite signaling circuits are associated with the toll lines. The toll line circuit TLC1 comprises a repeating coil 400, attenuation pads P41 and P42, pad control relays 410 and 411, a directionally selective coil 420, a cut-off relay 425, and a repeater termination consisting of condenser 423 and resistor 424 in series. The directionally selective coil 420 permits signaling current incoming over toll line T12 to pass to the signal receiver SR1 and permits signaling current from transmitter ST1 to pass out over line T12; but coil 420 prevents the passing of any substantial portion of the signaling current outgoing from transmitter ST1 into the signal receiver SR1. The normally operated cut-off relay 425 is released to open the talking connection between toll line T12 and the trunk circuits OT1 and IT1 whenever signals are being sent out by transmitter ST1 or received by the signal receiver SR1. The toll line circuit TLC2 is similar to the circuit TLC1, the reference characters of like elements in these circuits having the same tens and units digits.

The signal transmitter ST1 comprises relays 431, 433 and 435 connected in series for control by seizure, selective and supervisory direct current signals transmitted by signal relay 140 of the outgoing trunk circuit OT1. Relays 432, 434, 438, 441, 444 and 445 are controlled by relays 431, 433 and 435 to transmit signals consisting of current of one of two signaling frequencies either followed or preceded by current of the other frequency for required intervals of time. Each of relays 435, 438 and 444 is a polarized relay having a normally energized biasing winding for normally holding the contacts in the position shown in the drawings. Each of relays 441 and 445 has a normally energized operating winding which normally maintains the contacts in the position shown in the drawings; and has a normally energized biasing winding which is effective to move the contacts to their alternate position when the circuit through the operating winding is opened. The tone supply circuit consists of two oscillators of known design, one comprising the vacuum tube 470 for generating oscillations of one of the two signaling frequencies and the other comprising the vacuum tube 480 for generating oscillations of the other of the signaling frequencies employed for transmitting signals over toll line T12 to the second toll office. The signal transmitter circuit ST2 is similar to the transmitter circuit ST1, the reference characters of like elements in these circuits having the same tens and units digits.

The two frequencies used for transmitting signals over toll line T12 in one direction are different from the two frequencies used for transmitting signals over toll line T12 in the other direction; for instance, the frequencies 680 cycles per second and 1615 cycles per second may be used in one direction and the frequencies 850 cycles per second and 1870 cycles per second may be used in the other direction.

The signal receiver circuit SR1 comprises an input transformer 510, an amplifier comprising vacuum tube 515, transformer 520, a peak limiting amplifier comprising vacuum tube 525, tuned networks 530 and 540, rectifiers 533 and 543, relay 534 for response to current of one of the two frequencies used for transmitting signals over toll line T12 from the tandem office, and relay 544 for response to current of the other of these two frequencies. Although the directionally selective coil 420 prevents the passing of a large portion of signaling currents from transmitter ST1 to receiver SR1, further protection against response to outgoing signaling currents is provided by a suppression network tuned to the outgoing signaling frequencies connected across the left windings of transformer 510. This network comprises condenser 505 and inductor 506 in series with a filter consisting of inductor 507 and condenser 508 in parallel. In order to secure a signal response, it is necessary that the signaling current of each frequency comprising a voice frequency signal incoming to the signal receiver be somewhat stronger than the sum of all other currents present at the time, and that current of the second of the two frequencies constituting a signal follow the current of the first frequency within a predetermined interval of time. Only if both of these conditions exist, will a signal operation be effected; and for this reason voice currents or other interfering currents will not effect a signal operation. A high resistance element 521, shunted by a small condenser 522, is connected in series with the grid of tube 525; and a non-linear impedance element 523, for instance, a piece of silicon carbide, is connected across the right windings of transformer 520 to limit the voltage applied to the grid of tube 525 and thereby to limit the current in the plate circuit of tube 525. If the desired limiting action is obtainable by the use of the resistor 521 and condenser 522 alone, the element 523 may be omitted; or if the desired limiting action is obtainable by the use of the non-linear impedance element alone, the resistor 521 and condenser 522 may be omitted. Although the plate current of tube 525 never exceeds a definite limiting value, the relative proportion of the various energy components in the output is at all times the same as that of these components in the input. In the plate circuit of tube 525, the network 530 offers substantially infinite impedance to current of one of the two signaling frequencies and the network 540 offers substantially infinite impedance to current of the other of the two frequencies so that relay 534 is energized only by the part of the current which is of the one signaling frequency and relay 544 is energized only by the part of the current which is of the other signaling frequency. Furthermore, relays 534 and 544 are each adjusted to be operatively responsive to a current equal in value to somewhat more than half the maximum output of tube 525. In other words, the energy of signaling frequency F1 must exceed the sum of all other energy components to effect the operation of relay 534; and the energy of signaling frequency F2 must exceed the sum of all other energy components to effect the operation of relay 535; and, therefore, both of these relays cannot be operated at the same time. Relays 535, 537, 545, 547, 550, 570, 575, 580, 585, 590, 595, 596 and 599 are controlled by relays 534 and 544 to transmit direct current seizure, selective and supervisory signals to the two-way trunk circuit TWT1, outgoing trunk circuit OT1 and incoming trunk circuit IT1. Relays 535 and 545 are slow-to-release relays which are directly controlled by relays 534 and 544. If relays 534 and 535 are operated responsive to current of signaling frequency F1, relay 535 remains operated for a predetermined interval of time after relay 534 releases; and signaling current of frequency F2 must be received before relay 535 releases in order that a signal operation result from the successive operation of relays 534 and 544. Likewise if relays 544 and 545 are operated responsive to current of signaling frequency F2, relay 545 remains operated for a predetermined interval of time after relay 544 releases; and signaling current of frequency F1 must be received before relay 545 releases in order that a signal operation result from the successive operations of relays 544 and 534. These protections against false signal operation will be further explained in describing the operations involved on calls over toll line T12. Each of relays 534, 544, 537, 547, 550, 570, 585 and 590 is a polarized relay which has a normally energized biasing winding for normally maintaining the contacts in the position shown in the drawings. Relay 515 is a polarized relay having a normally energized operating winding which normally maintains the contacts in the position shown in the drawings and which has a normally energized biasing winding which effects the operation of the contacts to their alternate positions when the circuit through the operating winding is opened. The signal receiving circuit SR2 is similar to the circuit SR1, the reference characters of like elements in these circuits having the same tens and units digits.

The above-mentioned network comprises condensers 505 and 508 and inductors 506 and 507 suppresses the outgoing signaling frequencies but transients produced at the beginning and the end of a signal impulse may be passed to the receiver and tend to cause false operation and interference with response to incoming signals. By using a band-pass filter tuned to the incoming signaling frequencies in place of the band suppression filter, the outgoing signaling currents could not cause false operation of the receiver. While the transients produced in an arrangement using a band-pass filter are not as high as those produced by the suppression network, they are of longer duration. Thus, in either case the transients may be high enough and long enough to cause interference unless the transients are reduced. Such a reduction may be effected by signal wave shaping or by adding a band-pass filter tuned to the outgoing signaling frequencies inserted between the secondary winding of transformer 429 and the back contacts of the cut-off relay 425 of the signal transmitter ST1. If the filter between the directionally selective coil 420 and the signal receiver SR1 is a band elimination filter, the signaling frequencies passed by the sending band-pass filter will be entirely rejected if the band width of the band-pass filter is equal to or less than the band width of the elimination filter. If the filter between the coil 420 and the signal receiver SR1 is a band-pass filter, as above suggested, all frequencies within the pass band of the receiving filter are attenuated by the sending band-pass filter thereby preventing false operation and interference with the receiver.

Further explanation of the invention will be facilitated by describing in detail the circuit operations involved on a call over toll line T12. Assume first that the plug P2 of a cord CD is inserted in jack J2 of the trunk circuit OT1 in Fig. 1, thereby closing a circuit from battery in the operator's position circuit, through the sleeve conductor of the cord CD, as fully described in the aforementioned patent to King et al., through the sleeve conductor of jack J2, a back contact of relay 106 of trunk circuit OT1, and through the upper winding of relay 104 to ground. Relay 104 operates and closes a circuit for operating relay 133. Relay 133 locks under control of relay 136 and closes a circuit for operating relay 110. Relay 110 closes a circuit for lighting the busy lamp 12 associated with jack J2, closes circuits for operating relays 124, 136 and 157; closes a circuit including the inner lower contact of relay 152 for operatively energizing the upper winding of relay 140; closes a circuit through the middle biasing winding of relay 140 in series with ballast lamp 141; connects ground to conductor 168 and disconnects the winding of relay 106 from conductor 168; disconnects conductor 170 from conductor 169 and the windings of relays 303 and 305 of the two-way trunk circuit TWT1; and connects conductor 170 to the winding of relay 105. The operation of relay 124 closes circuits for operating relays 112 and 120, connects ground to conductor 168 and connects ground through its middle lower front contact, resistor 125, back contacts of relays 151 and 130, conductor 102, through the ring conductors of jack J2, plug P2 and cord CD to operate a relay in the operator's position circuit. The connection of ground to conductor 168 operates relay 304. Relay 304 locks to this ground and disconnects the windings of relays 305 and 303 from conductor 169. The operation of relay 136 opens the locking circuit of relay 133, but relay 133 holds under control of relay 104. Relay 133 is slow to release and relay 136 is slow to operate so as to prevent the momentary release of relay 140 if relay 140 operates before the plug P2 is fully seated in jack J2. The operation of relay 140 closes a circuit from battery through resistor 142, front contact of relay 140, conductor 164, through the windings of relays 431, 433 and 435 of signal transmitting circuit ST1 to initiate the transmission of a seizure signal over toll line T12. The operation of relay 112 opens the normally closed circuit for operating pad control relay 411, closes a circuit for holding the busy lamp L2 lighted, and further opens the connection between conductors 169 and 170. The operation of relay 120 disconnects relay 134 and conductor 167 from the windings of retard coil 160 and conductors 161 and 162 and connects these conductors through the windings of relays 123 and 156 and conductor 163 to the winding of pad control relay 411. The operation of relay 136 opens a normally closed short circuit around the winding of relay 152 and closes a short circuit around resistor 153. Relay 152 is thereupon operated in a circuit through resistor 154, inner upper back contact of relay 130, conductor 101, through the tip conductor of jack J2 and plug P2, thence to battery in the operator's position circuit as described in the aforementioned King et al. patent. The operation of relay 152 closes a circuit for operating relay 151 and opens the operating circuit of relay 157. Relay 151 locks under control of relay 136 and connects the operating, upper winding of relay 140 through a back contact of relay 130, conductor 102, the ring conductors of jack J2, plug P2 and cord CD to battery in the operator's position circuit. When the dial key (not shown) is operated, the impulse contacts of the dial are connected in series with the operating winding of relay 140 as described in detail in the aforementioned King et al. patent; and, when the called toll route number is dialed, the impulse relay 140 operates and releases in response to each dial impulse to repeat the impulses to the signal transmitter ST1 as hereinafter described.

The aforementioned closing of the circuit through the front contact of relay 140 and windings of relays 431, 433 and 435, in response to insertion of plug P2 in jack J2, causes the operation of these relays. Relay 431 closes a circuit for operating the slow-to-release relay 432, and causes the release of the normally operated cut-off relay 425. The circuit in which relay 425 is normally operated is traced from ground at the back contact of relay 431, through back contacts of relays 432 and 434, winding of relay 425, conductor 500, and through back contacts of relays 585 and 550, to battery. The release of relay 425 opens the connection between the talking conductors 161 and 162 of outgoing trunk circuit OT1 and repeating coil 400, and connects the left windings of repeating coil 429 to the repeating coil 400. The operation of relay 433 closes a circuit from ground through the left contact of relay 445, right windings of repeating coil 429, back contact of relay 444, front contact of relay 433, conductor 450 and the right windings of the tone supply transformer 471, to ground. The operation of relay 432 also connects conductor 450 to the back contact of relay 444, the front contacts of relays 432 and 433 being connected in parallel. The alternating potential of frequency F1 generated by the oscillator tube 470 thereupon initiates signaling current of frequency F1 through transformer 471, and repeating coils 429 and 400, to transmit the first part of a seizure signal over toll line T12 to the signal receiver SR2 in the tandem office. The aforementioned operation of relay 435 closes a circuit for energizing the lower winding of relay 438 and opens the normally closed circuit through the lower winding of relay 441. Upon energization of its lower winding, relay 438 opens its left contact and closes its right contact. When the circuit through the lower winding of relay 441 is opened by the operation of either or both of relays 435 and 438, condenser 439 is charged in series with resistor 440, the charging current being effective to hold relay 441 operated and thereby delay the operation of relay 444 for about .030 second after the operation of relay 433 initiates the signaling current of frequency F1. When the charging current is no longer sufficient to maintain the operative energization of the lower winding of relay 441, the normally energized upper winding of relay 441 effects the opening of the left contact and the closing of the right contact of this relay, thereby opening the energizing circuit through the upper winding of relay 445 and closing an operating circuit through the upper winding of relay 444. The operation of relay 444 disconnects the right windings of repeating coil 429 from conductor 450 and transformer 471, and connects the right windings of repeating coil 429 through conductor 460 to the windings of tone supply transformer 481. Since the closing of the operating circuit of relay 444 is delayed by the charging of condenser 439, the current of frequency F1 through coils 429 and 400 and toll line T12 continues for a minimum of .030 second before the operation of relay 444 terminates the signaling current of frequency F1 and initiates a signaling current of frequency F2. The upper winding of relay 445 continues to be energized, after the operation of relay 441, by current charging condenser 442 in series with resistor 443. The opening of the left contact and closing of the right contact of relay 445 is thereby delayed for an interval of approximately .100 second, during which interval there is a current of frequency F2 through coils 429 and 400 and toll line T12. The opening of the left contact of relay 445 ends the signaling current of frequency F2, and the closing of the right contact of relay 445 closes a circuit, including a back contact of relay 434, for energizing the winding of the cut-off relay 425. Reoperation of relay 425 disconnects repeating coil 429 from repeating coil 400 and reconnects coil 400 to conductors 161 and 162.

Thus a seizure signal, consisting of current of frequency of F1 for an interval of not less than .030 second followed immediately by current of frequency F2 for an interval of about .100 second, is transmitted over toll line T12 to the tandem office, through repeating coil 600, pads P61 and P62, the left windings of directionally selective coil 620, conductors 701 and 702, condensers 703 and 704 and the right windings of transformer 710. The signal energy is applied through transformer 710 to the grid of amplifying tube 715, is amplified by tube 715, and is applied through transformer 720 to the grid of tube 725. The resistor 721 in the grid circuit of tube 725 effects a drop in potential which limits the amplitude of the output voltage. The network 730 offers substantially infinite impedance to current of frequency F1, so that the signaling current of this frequency in the plate circuit of tube 725 is applied to and rectified by the full-wave rectifier 733; and the rectified current operatively energizes the upper winding of relay 734. When the signaling current of frequency F1 ceases, relay 734 releases. The network 740 offers substantially infinite impedance to current of frequency F2; and the signaling current of this frequency in the plate circuit of tube 725, immediately following the current of frequency F2, is applied to and rectified by the rectifier 743; and the rectified current operatively energizes the upper winding of relay 744. When the current of frequency F2 ceases, relay 744 releases. Since the current in the plate circuit of tube 725 is limited to a value which is sufficient for operating relay 734 only when substantially all of the current in line T12 is of frequency F1 and which is sufficient for operating relay 744 only when substantially all of the current in line L1 is of frequency F2, the operation of either of these relays, when voice or other interfering currents are present, is prevented. The operation of relay 734 in response to the impulse of current of frequency F1 closes a circuit for operating relay 735 and closes a circuit through rectifier 736, the middle winding of relay 750, upper winding of relay 737 and resistor 738, to battery. Since ground is normally connected through back contacts of relays 737 and 745, to resistor 738, the operation of relay 734 is ineffective to energize the middle winding of relay 750 and upper winding of relay 737. When the current of frequency F1 ceases, relay 734 releases but relay 735 is a slow-to-release relay and remains operated for approximately .020 second after the release of relay 734. The operation of relay 744, in response to signaling current of frequency F2 immediately following the current of frequency F1, closes a circuit for operating relay 745 and closes a circuit through rectifier 746, the lower winding of relay 750, the upper winding of relay 747 and resistor 748. Since the operation of relay 744, in response to a seizure signal, occurs before relay 735 has released, the current in this circuit effects the operation of relays 747 and 750. The operation of relay 750 opens the normally closed energizing circuit of cut-off relay 625, this circuit being traced through back contacts of relays 750 and 785, conductor 700, winding of relay 625, and through back contacts of relays 634, 632 and 631 to ground. The operation of relay 747 prevents the connection of a short-circuiting ground to resistor 748 when relay 735 releases, and closes a circuit from ground through conductor 749, resistor 791, lower winding of relay 790, and through resistor 793 to battery. Relay 790 operates, closing a circuit from ground through its left contact, winding of relay 795, conductor 970, lowermost back contact of relay 910 of outgoing trunk circuit OT2, lower back contact of relay 912, conductor 969, back contact of relay 804 of two-way trunk circuit TWT2, back contact of relay 807, and through the winding of relay 803 to battery. Relays 795 and 803 are operated by the current in this circuit. The operation of relay 795 closes a circuit for operating relay 796 and connects ground to conductor 749 to maintain the energization of the lower winding of relay 790. Relay 796 also connects ground to conductor 749 and connects the right contact of relay 790 through resistor 797 to condenser 798 in preparation for receiving succeeding signals. When the current of frequency F2 ends, relay 744 releases, causing the release of relays 745, 747 and 750, the release of relay 745 occurring about .020 second after the release of relay 744. The release of relay 750 closes the circuit for operating cut-off relay 625; and relay 625 closes the talking connection between toll line T12 and conductors 961 and 962.

The aforementioned operation of relay 803, in response to the seizure signal, connects ground to conductor 823 to mark the two-way trunk circuit TWT2 and associated toll line T12 busy in the banks of the toll route selectors. This ground potential is further connected through conductors 823 and 968, back contacts of relays 924 and 910 of the outgoing trunk circuit OT2 to the winding of relay 906. Relay 906 operates, connects battery to the sleeve of jack J9 as a busy indication, and closes a circuit for operating relay 912. Relay 912 closes a circuit for lighting busy lamp L9 and opens the normally closed circuit for operating pad control relay 611. The aforementioned operation of relay 803 disconnects conductors 801 and 802 from conductors 821 and 822 leading to terminals in the banks of toll route selectors, and closes a circuit for operating relay 805 of trunk circuit TWT2 and line relay 857 of toll selector TS2. This circuit is traced from ground through the front contact of relay 790, winding of relay 795, conductor 970, back contacts of relays 910 and 912, conductor 969, back contact of relay 804, winding of relay 805, inner upper front contact of relay 803, conductor 967, thence in simplex through resistors 921 and 922, inner back contacts of relay 920, windings of retard coil 960, outer back contacts of relay 930, conductors 801 and 802, outer front contacts of relay 803, conductors 851 and 852, back contacts of relay 860 of selector TS2, resistors 861 and 862, to and through resistor 863 and another back contact of relay 860, through the winding of relay 857 to battery. The operation of relay 805 closes a circuit through resistor 806 for holding relay 803 and closes a circuit for operating relay 807. Relay 807 closes a holding circuit for relay 803 and connects ground to conductor 853 thereby operating relay 799 of signal receiver SR2. Relay 799 disconnects the winding of relay 780 from the contact of relay 570, to prevent the operation of relay 780 in response to signals incoming over line T12 and connects relay 780 to conductor 649 for operation as hereinafter described during the transmission of signals over line T12 to the calling office. Relay 807 is a slow-to-release relay in order to maintain the connection of ground to conductor 853 during the response of relay 805 to dial impulses as hereinafter described. The operation of relay 857 closes a circuit for operating the slow-to-release relay 858. Relay 858 connects ground to conductor 853, and connects ground to conductor 859 leading to the alarm circuit which operates in usual manner to operate an alarm device if the selector TS2 fails to complete its selective operations within a predetermined interval of time.

No further operations take place until the calling operator dials the desired toll route number, and also the called subscriber's number if the called line is in an automatic office. Relay 140 of outgoing trunk circuit OT1 responds to the dial impulses, opening and closing the circuit through conductor 164 and the windings of relays 431, 433 and 435 in response to each opening and closing of the impulse contacts of the dial. The release of relay 431 opens the operating circuit of relay 432 but relay 432 is slow in releasing and remains operated during the transmission of dial impulses. With relay 431 released and relay 432 operated, a circuit is closed in response to the first impulse of each train for operating relay 434; and since relay 434 is slow in releasing, it remains operated until relay 433 reoperates, after receiving the last impulse of the train. The operation of relay 434 causes the release of the cut-off relay 425 to disconnect coil 400 from conductors 161 and 162 during the transmission of dial impulses. The release of relay 435 opens the circuit through the lower winding of relay 438 and closes a circuit including the right contact of relay 438 for energizing the upper winding of relay 445. Relay 438 is held operated, after relay 435 releases, by current charging condenser 436. The energization of the upper winding of relay 445 effects the closing of its left contact; and, since relay 434 is operated and the right contact of relay 444 is closed, the right windings of coil 429 are connected through conductor 460 to transformer 481 to initiate a current of frequency F2 in line T12. As soon as the current charging condenser 436 is no longer sufficient to maintain the closure of the right contact of relay 438 (about .030 second after relay 435 releases), the lower winding of relay 441 is again energized through the left contacts of relays 438 and 435. Relay 441 thereupon closes its left contact to maintain the energization of the upper winding of relay 445, the energization of this winding being maintained by current charging condenser 442 after relay 438 releases and before relay 441 operates. The opening of the right contact of relay 441 deenergizes the upper winding of relay 444; so that relay 444 opens its left contact to disconnect tone transformer 481 from coil 429 and closes its right contact to connect tone transformer 471 thereto, thereby ending the current of frequency F2 through coils 429 and 400 and toll line T12 and starting current of frequency F1. When relay 435 reoperates, at the end of the first dial impulse, it opens the circuit for energizing the lower winding of relay 441 and closes the circuit for energizing the lower winding of relay 438. Relay 438 immediately actuates its contacts but the actuation of the contacts of relay 441 is delayed while condenser 439 is charging. When relay 441 actuates its contacts, about .030 second after relay 435 reoperates, the upper winding of relay 444 is energized; and the coil 429 is disconnected from transformer 471 and again connected to transformer 481, thereby ending the current of frequency F1 and initiating current of frequency F2. Each release and reoperation of relay 435 in response to succeeding dial impulses in the same train effects the above-described cycle of operations whereby there is a current of frequency F2 followed by current of frequency F1 through coils 429 and 400 and toll line T12 for each dial impulse. At the end of the last impulse of the train, the current of frequency F2 continues for about .100 second while condenser 442 is being charged, whereupon the contacts of relay 445 are actuated to open the circuit through the right windings of coil 429. Relay 434 releases when relay 431 remains operated at the end of a train of impulses, thereby causing the reoperation of cut-off relay 425.

Dialing may start within .080 second after the plug P2 is inserted in jack J2. In this case, relay 445 has not been operated to end the current of frequency F2 of the seizure signal, the release of relay 431 and operation of relay 433 maintain the deenergization of relay 425, and the release of relay 435 prevents the deenergization of the upper winding of relay 445, for about .030 second while condenser 436 is charging and until relay 438 opens its right contact. Thus there is no interval between the current of frequency F2 of the seizure signal and the current of frequency F2 for the first dial impulse.

Each succeeding train of dial impulses effects the operation of the signal transmitter ST1 in like manner to transmit voice frequency impulses over toll line T12 to the receiver SR2 in the tandem office. The signal receiver SR2 responds to each train of dial impulses, the first train being effective to control the selective operation of selector TS2. The current of frequency F2, responsive to the first opening of the impulse contacts of the dial, causes the operation of relay 744. Relay 744 closes a circuit for operating relay 745 and closes a circuit through rectifier 746 and windings of relays 747 and 750. Since relay 735 is not then operated, the windings of relays 747 and 750 are short-circuited through back contacts of relays 735 and 747. When the current of frequency F2 through toll line T12 ceases and current of frequency F1 begins, relay 744 releases and relay 734 operates. Being slow in releasing, relay 745 remains operated for about .020 second after relay 744 releases; and the operation of relay 734, while relay 745 is operated, effects the operation of relays 735, 737 and 750. The operation of relay 750 causes the release of cut-off relay 625 to disconnect coils 600 and 620 from talking conductors 961 and 962; and the operation of relay 737 prevents the short-circuiting of its upper winding, when relay 745 releases, and connects ground to conductor 739, thereby energizing the upper winding of relay 770. The energization of the upper winding of relay 770 effects the opening of its left contact and the closing of its right contact. The closing of the front contact of relay 770 is without effect, since relay 799 is operated; but the opening of the left contact of relay 770 opens the circuit through the upper winding of relay 775, the deenergization of this winding being delayed for about .030 second while condenser 771 is being charged in series with resistor 772. The deenergization of the upper winding of relay 775 causes the closing of its left contact whereby ground is connected to conductor 794 to effect a reversal of the current in the lower winding of relay 790. Relay 790, thereupon, opens its left contact to cause the release of relays 795, 805 and 857. The closing of the right contact of relay 790 effects the discharge of condenser 798. When the current of frequency F1 ends, relays 734, 735 and 737 release, the release of relay 735 being delayed for .020 second. The release of relay 737 disconnects ground from conductor 739 but the upper winding of relay 770 remains energized for about .030 second while condenser 798 is being charged in series with resistor 797. When the charging current is no longer effective to operatively energize the upper winding of relay 770, the biasing winding effects the opening of the right contact and closing of the left contact of this relay. The upper winding of relay 775 is thereby energized to effect the opening of the left contact of this relay; and the resulting reversal of current through the lower winding of relay 790 causes the closing of the left contact of relay 790 to reoperate relays 795, 805 and 857. The current of frequency F2, immediately following the current of frequency F1 in line T12, causes the successive operations of relays 744 and 745. Since relay 735 has not yet released, the operation of relay 744 causes the operation of relay 747 and holds relay 750; and the operation of relay 747 connects ground to conductor 749. Since relay 796 is slow in releasing, it remains operated during the response of relays 770 and 775 to dial impulses and maintains the connection of ground to conductor 749. Each succeeding dial impulse in the train effects the reoperation of the relays of the receiver SR2 to effect a release and reoperation of relays 795, 805 and 857. When the current of frequency F2, following the last impulse of the train ceases, the release of relay 744 causes the release of relays 745 and 750. The release of relay 750 closes the circuit for operating cut-off relay 625 to reconnect coils 600 and 620 to talking conductor 961 and 962. Relay 790 now maintains the connection of ground through the winding of relay 795 to conductor 970 to hold relay 805 of the two-way trunk circuit TWT2 and to hold the line relay 857 of selector TS2 until an idle trunk is seized in the level corresponding to the first digit dialed by the calling operator.

Since relay 807 of two-way trunk circuit TWT2 and relay 858 of selector TS2 are slow in releasing, these relays remain operated during the response of relays 805 and 857 to dial impulses. The release of relay 857 in response to the first impulse incoming over toll line T12 closes a circuit for operating the vertical stepping magnet 867 and the slow-to-release relay 869 in series. The operation of magnet 867 steps the brushes 871, 872, 873 and 874 up the first level of the terminal bank. The vertical off-normal springs 864 are actuated when the shaft is moved out of normal position, closing a circuit including the front contact of relay 869 and conductor 853 for operating relay 865. Relay 865 locks, through the back contact of rotary stepping magnet 866 and a front contact of relay 865, to ground at a back contact of relay 860. When relay 857 reoperates at the end of the first impulse, magnet 867 releases but relay 869 is slow in releasing and remains operated until all of the impulses in the train created by the dialing of the first digit have been received by relay 857. Relay 858 is also slow in releasing and remains operated during the response of relay 857 to dial impulses. Each succeeding release and reoperation of relay 857 causes the operation and release of magnet 867, stepping the brushes of the selector up to the level corresponding to the digit dialed. When relay 869 releases, after all of the impulses in the train have been received, it closes a circuit for operating the rotary stepping magnet 866. This circuit is traced from battery through the winding of magnet 866, lower front contact of relay 865, back contact of relay 869, conductor 853, to ground at the upper front contact of relay 858. The operation of magnet 866 rotates the brushes one step, into engagement with the first set of terminals in the selected level. When magnet 866 opens its back contact, relay 865 releases. The release of relay 865 causes the release of magnet 866. If the terminal, with which test brush 873 is in engagement, is guarded by a ground potential, relay 865 reoperates when magnet 866 releases; the operating circuit being traced through the lower front contact of springs 864, back contact of magnet 866, lowermost back contact of relay 860 and test brush 873. The reoperation of relay 865 causes the operation of the rotary stepping magnet 866, thereby advancing the brushes to the next set of terminals. The operation of magnet 866 releases relay 865; and the release of relay 865 releases magnet 866. Relay 865 and magnet 866 repeat this cycle of operations, to advance the brushes step by step, until brush 873 encounters a terminal not marked by ground potential; whereupon, relay 860 is operated to seize the idle set of terminals. The circuit for operating relay 860 is traced from battery through the winding of relay 865, front contact of the vertical off-normal springs 864, back contact of magnet 866, winding of relay 860, lower back contact of the 11th rotary step springs 856, through conductor 853 to ground at the upper front contact of relay 858. Relay 865 is marginal and does not reoperate in series with the winding of relay 860. Relay 860 disconnects the winding of relay 857 from conductors 851 and 852 and connects these conductors to brushes 871 and 872 thence to the trunk or selector circuit connected to the selected set of terminals. The release of relay 857 causes the release of relay 858 but ground is not thereby disconnected from conductor 853 since this conductor is connected to ground at the lower front contact of relay 807.

Assume first that the call is routed to an operator in the second toll office, that the terminals, in the level selected in response to the first digit dialed by the calling operator, are connected to incoming trunk circuits and that the terminals 876, connected to the trunk circuit IT2, are selected by the trunk hunting operation of the selector TS2. In this case, the operation of relay 860 closes a circuit for operating the line relay 1005 of trunk circuit IT2. This circuit is traced from battery through the winding of relay 1005, thence in simplex through resistors 1015, 1016 and 1017, the windings of retard coil 1000, conductors 1001 and 1002, brushes 871 and 872, front contacts of relay 860, conductors 851 and 852, front contacts of relay 803, conductors 801 and 802, back contacts of relay 930, windings of retard coil 960, back contacts of relay 920, through resistors 921 and 922, thence through conductor 967, inner upper front contact of relay 803, winding of relay 805, back contact of relay 804, conductor 969, lower back contact of relay 912, lowermost back contact of relay 910, conductor 970, winding of relay 795, to ground at the left contact of relay 790 of signal receiver SR2. Relays 795 and 805 are thereby held operated in series with relay 1005. With relay 1019 non-operated, resistor 1018 is short-circuited; and, since the resistance of resistors 1015 and 1017 together is equal to that of resistor 1016, the simplex is balanced so that pad control relay 934 of outgoing trunk circuit OT2 remains non-operated. In the incoming trunk IT2 the winding of pad control relay 1009 is bridged across the end of the simplex path; but this relay does not operate since the simplex circuit is balanced when an intertoll trunk, such as toll line T12, is connected to the incoming trunk circuit IT2. The aforementioned operation of relay 1005 closes a circuit for lighting the answering lamp L10 and connects the source of ringing current 1006 through a back contact of relay 1031 and condenser 1030 to talking conductor 1042 to transmit a ringing tone to the calling operator to indicate that the toll operator in the called toll office is being signaled. The calling operator having completed dialing restores the dialing key to normal, thereby reconnecting the operator's telephone through plug P2 and jack J2 to the outgoing trunk circuit OT1.

When the call is answered by insertion of the plug of a cord in jack J10, relay 1044 is operated in a circuit through conductor 1043 and the sleeve conductor of jack J10, to battery in the answering operator's position circuit. Relay 1044 closes a circuit for operating relay 1034. Relay 1034 opens the repeater termination, comprising resistor 1033 and condenser 1032 normally bridged across the talking conductors 1041 and 1042, and closes a circuit for operating relay 1031. This circuit is traced through the lower front contact of relay 1034, front contact of relay 1005, conductor 1003, brush 873, lowermost front contact of relay 860, conductor 853, to ground at the lower front contact of relay 807. Relay 1031 locks under control of relay 1008 through conductor 1003, independent of relay 1034. Relay 1031 extinguishes lamp L10, opens the connection through ringing tone condenser 1030 and closes a circuit for operating relay 811 of two-way trunk circuit TWT2. This circuit is traced from ground, through the outer upper front contact of relay 1034, back contact of relay 1012, front contact of relay 1031, conductor 1004, brush 874, a front contact of relay 860, a back contact of the 11th rotary step springs 856 of selector TS2, and through conductor 854 to the winding of relay 811. Relay 811 closes a circuit from battery through resistor 942 of outgoing trunk circuit OT2, conductor 966, front contact of relay 811, back contact of relay 810, conductor 965, back contact of relay 940, conductor 964 through the windings of relays 631, 633 and 635, in series, to ground. Relay 631 closes a circuit for operating the slow-to-release relay 632 and causes the release of the normally operated cut-off relay 625. The release of relay 625 connects the left windings of repeating coil 629 to the repeating coil 600. The operation of relay 633 closes a circuit from ground through the right contact of relay 645, left windings of repeating coil 629, back contact of relay 644, front contact of relay 633, conductor 650 and the left windings of transformer 671 to ground. The operation of relay 632 also connects conductor 650 to the back contact of relay 644, the lower front contact of relay 632 and front contacts of relays 633 and 634 being connected in parallel. The alternating potential of frequency F3 generated by the oscillator 670 thereupon initiates signaling current of frequency F3 through transformer 671, repeating coils 629 and 600 to transmit the first part of an answering supervisory signal over toll line T12 to signal receiver SR1. The operation of relay 635 closes a circuit for energizing the lower winding of relay 638 and opens a circuit including the right contact of relay 638 and the lower winding of relay 641. Upon energization of its lower winding, relay 638 opens its right contact and closes its left contact. When the circuit through the lower winding of relay 641 is opened by the operation of either or both of relays 635 and 638, condenser 639 is charged in series with resistor 640, the charging current being effective to hold relay 641 operated and thereby delay the operation of relay 644 for about .030 second after the operation of relay 635 initiates the signaling current of frequency F3. When the charging current is no longer sufficient to maintain the operative energization of the lower winding of relay 641, the normally energized upper winding of relay 641 effects the opening of the right contact of this relay thereby opening the energizing circuit through the upper winding of relay 645 and closing an operating circuit through the upper winding of relay 644. The operation of relay 644 disconnects the left windings of repeating coil 629 from conductor 650 and transformer 671 and connects the left windings of repeating coil 629 through conductor 660 to the windings of tone supply transformer 681. Since the closing of the operating circuit of relay 644 is delayed by the charging of condenser 639, the current of frequency F3 through coils 629 and 600 and toll line T12 continues for a minimum of .030 second before the operation of relay 644 terminates the signaling current of frequency F3 and initiates a signaling current of frequency F4. The upper winding of relay 645 continues to be energized, after the operation of relay 641, by current charging condenser 642 in series with resistor 643. The opening of the right contact and closing of the left contact of relay 645 is thereby delayed for an interval of approximately .100 second, during which interval there is a current of frequency F4 through coils 629 and 600 and toll line T12. The opening of the right contact of relay 645 ends the signaling current of frequency F4 and the closing of the left contact of relay 645 closes the circuit for energizing the winding of the cut-off relay 625. The reoperation of relay 625 disconnects repeating coil 629 from repeating coil 600 and reconnects coil 600 to talking conductors 961 and 962.

Thus an answering or off-hook signal, consisting of current of frequency F3 for an interval of about .030 second followed immediately by current of frequency F4 for an interval of about .100 second, is transmitted over toll line T12 to the calling office, through repeating coil 400, pads P41 and P42, the right windings of directionally selective coil 420, conductors 501 and 502, condensers 503 and 504 and the left windings of transformer 510. The signal energy is applied through transformer 510 to the grid of amplifier tube 515, is amplified by tube 515, and is applied through transformer 520 to the grid of tube 525. The resistor 521 in the grid circuit of tube 525 effects a drop in potential which limits the amplitude of the output voltage. The network 530 offers substantially infinite impedance to current of frequency F3 so that the signaling current of this frequency in the plate circuit of tube 525 is applied to and rectified by the full wave rectifier 533; and the rectified current operatively energizes the upper winding of relay 534. The network 540 offers substantially infinite impedance to current of frequency F4; and the current of this frequency in the plate circuit of tube 525, immediately following the current of frequency F3, is applied to and rectified by the rectifier 543; and the rectified current operatively energizes the upper winding of relay 544. When the current of frequency F4 ceases, relay 544 releases. Since the current in the plate circuit of tube 525 is limited to a value which is sufficient for operating relay 534 only when substantially all of the current incoming in line T12 is of frequency F3 and which is sufficient for operating relay 544 only when substantially all of the current in line T12 is of frequency F4, the operation of either of these relays, when voice or other interfering currents are present, is prevented. The operation of relay 534, in response to current of frequency F3, closes a circuit for operating relay 535 and closes a circuit through rectifier 536, the middle winding of relay 550, upper winding of relay 537 and resistor 538 to battery. Since ground is normally connected through back contacts of relays 537 and 545 to resistor 538, the operation of relay 534 is ineffective to energize the middle winding of relay 550 and upper winding of relay 537. When the current of frequency F3 ceases, relay 534 releases but relay 535 is a slow-to-release relay and remains operated for approximately .020 second after the release of relay 534. The operation of relay 544, in response to signaling current of frequency F4 immediately following the current of frequency F3, closes a circuit for operating relay 545 and closes a circuit through rectifier 546, the lower winding of relay 550, the upper winding of relay 547 and resistor 548. Since the operation of relay 544, in response to the answering signal, occurs before relay 535 has released, the current in this circuit effects the operation of relays 547 and 550. The operation of relay 550 causes the release of the cut-off relay 425. Relay 547 prevents the connection of a short-circuiting ground to resistor 548 when relay 535 releases, and closes a circuit from ground through conductor 549, resistor 591, lower winding of relay 590 and through resistor 593 to battery. Relay 590 operates closing a circuit from ground through its right contact, winding of relay 595, conductor 170, a front contact of relay 110, and through the winding of relay 105. Relays 595 and 105 are operated by the current in this circuit. The operation of relay 595 closes a circuit for operating relay 596 and connects ground to conductor 549 to maintain the energization of the lower winding of relay 590. Relay 596 also connects ground to conductor 549 and connects the left contact of relay 590 through resistor 597 to condenser 598 in preparation for receiving succeeding signals. When the current of frequency F4 ends, relay 544 releases causing the release of relays 545, 547 and 550, the release of relay 545 occurring about .020 second after the release of relay 544. The release of relay 550 closes the circuit for operating cut-off relay 425 to close the connection between coil 400 and conductors 161 and 162. The operation of relay 105 opens the circuit through the lower winding of relay 104 thereby leaving the high resistance upper winding of relay 104 in series with the sleeve conductor of jack J2 and plug P2 so as to extinguish the supervisory lamp SL2 as an answering or off-hook signal.

While the answering operator's telephone set is connected to trunk IT2, battery is connected through jack J10 to both of conductors 1041 and 1042, thence through the windings of retard coil 1010, through resistor 1011 and relay 1012, conductor 1013, through the upper back contact of relay 1035 and winding of relay 1021 to ground. Relay 1021 operates closing a circuit for operating relay 1019. Relay 1019 disconnects pad control relay 1009 and opens the short circuit around resistor 1018 and short-circuits resistor 1017 to unbalance the simplex circuit through conductors 1001 and 1002 so as to effect the operation of pad control relay 934 of outgoing trunk circuit OT2. Relay 934 closes a circuit through conductor 963 for operating relay 611. Relay 611 opens the circuit for operating relay 610; and with relay 610 released, pads P61 and P62 are included in the talking circuit. After the operator's telephone set is disconnected from trunk IT2 and this trunk is connected through the cord to another trunk or toll line, relay 1021 is held operated if this other trunk or toll line is a switching trunk or tributary line but is released if it is a toll line or intertoll trunk. The release of relay 1021 causes the successive release of relays 1019, 934 and 611 and the operation of relay 610 to short-circuit the pads P61 and P62. If the intertoll trunk associated with the outgoing trunk circuit OT2 is one which is not provided with transmission pads, relay 934 is not provided. If the intertoll trunk associated with the outgoing trunk circuit OT2 is one which does not require the short-circuiting of the pads of a line or trunk to which the incoming trunk circuit IT2 is connected by the answering operator's cord, resistors 921 and 922 of the outgoing trunk circuit OT2 would be of such value as to unbalance the simplex circuit and thereby cause the operation of relay 1009 of the incoming trunk circuit IT2. The operation of relay 1009 closes a circuit for operating relay 1035. Relay 1035 disconnects relay 1021 from conductors 1041 and 1042 and connects battery through resistors 1037 and 1038 to conductors 1041 and 1042 to hold operated the pad control relay of the trunk or line to which the trunk circuit IT2 is connected by the answering operator's cord.

The talking connection between outgoing trunk circuit OT1 and incoming trunk circuit IT2 includes conductors 101 and 102, front contacts of relay 130, conductors 161 and 162, front contacts of relay 425, resistors 421 and 422, repeating coil 400, toll line T12, repeating coil 600, resistors 621 and 622, front contacts of relay 625, conductors 961 and 962, back contacts of relay 930, conductors 801 and 802, front contacts of relay 803, conductors 851 and 852, front contacts of relay 860, brushes 871 and 872, conductors 1001 and 1002, condensers 1050 and conductors 1041 and 1042.

If the answering operator disconnects from jack J10, relay 1044 releases causing the release of relay 1034 to disconnect ground from conductor 1004 and effect the release of relay 811. The release of relay 811 causes the release of relays 631, 633 and 635 of signal transmitter ST2, thereby effecting the transmission of an "on-hook" signal consisting of current of frequency F4 followed by current of frequency F3. The release of relay 631 closes a circuit through a front contact of relay 632 and the front contact of relay 799 for operating relay 780. The operation of relay 780 causes the operative energization of the upper winding of relay 785 for about .550 second while condenser 782 is discharging, the reason for this being hereafter described in the case of release of the connection while a line busy signal is being transmitted to the calling operator on a call to a subscriber in a local dial office. The release of relay 631 also closes a circuit for operating the slow-to-release relay 634. Being slow in releasing relay 632 remains operated long enough, after relay 631 releases, to cause the operation of relay 634. The operation of relay 634 causes the release of cut-off relay 625 to disconnect line T12 from conductors 961 and 962 during the transmission of the "on-hook" signal. The release of relay 635 opens the circuit through the lower winding of relay 638 and closes a circuit including the left contact of relay 638 for energizing the upper winding of relay 645. Relay 638 is held operated for about .030 second after relay 635 releases, by current charging condenser 636. The energization of the upper winding of relay 645 effects the closing of its right contact; and, since relay 634 is operated and the right contact of relay 644 is closed, the left windings of coil 629 are connected through conductor 660 to transformer 681 to initiate current of frequency F4 in line T12. When the current charging condenser 636 is no longer effective to maintain the operative energization of the lower winding of relay 638, the circuit through the upper winding of relay 645 is opened at the left contact of relay 638; and the lower winding of relay 641 is again operatively energized in the circuit including the right contacts of relays 638 and 635, the contacts of relay 641 being thereby restored to normal. After relay 638 releases and until relay 641 closes its right contact, the energization of the upper winding of relay 645 is maintained by current charging condenser 642. When relay 641 reoperates, the opening of the left contact of this relay deenergizes the upper winding of relay 644; and the closing of the right contact of relay 641 maintains the energization of the upper winding of relay 645. Relay 644 opens its right contact, thereby disconnecting tone transformer 681 from coil 629; and closes its left contact, thereby connecting tone transformer 671 to coil 629. Thus the impulse of current of frequency F4 is ended and an impulse of current of frequency F3 is started through coils 629 and 600 and toll line T12. When relay 632 releases, it causes the release of relay 634, the current of frequency F3 being maintained for about .750 second before the release of relay 634 disconnects coil 629 from conductor 650 and transformer 671. The release of relay 634 causes the release of relay 780; and the release of relay 780 causes the operative energization of the upper winding of relay 785 while condenser 781 is discharging. As long as either of relays 634 or 785 is operated, the operating circuit for relay 625 is open and the coil 600 disconnected from talking conductors 961 and 962.

In response to the "on-hook" signal transmitted over line T12 to the signal receiver SR1, relay 544 is operated by the current of frequency F4 and relay 534 is operated by the current of frequency F3. Relay 544 closes a circuit for operating relay 545 which remains operated until relay 534 closes circuits for operating relays 535, 537 and 550. The operation of relay 550 causes the release of cut-off relay 425; and the operation of relay 537 connects ground to conductor 539 to energize the upper winding of relay 570. Relay 570 opens the normally closed circuit through the upper winding of relay 575 and closes a circuit for operating relay 580. The operation of relay 580 closes a circuit for charging condenser 581 and closes a circuit for discharging the normally charged condenser 582 through the winding of relay 585; whereby relay 585 is operatively energized for about .550 second. About .020 second after relay 570 operates, relay 575 closes its right contact; whereby the current through the lower winding of relay 590 is reversed and relay 590 releases, opening its right contact and closing its left contact. The opening of the right contact of relay 590 causes the release of relays 595 and 105. Since relay 534 is held operated for about .750 second, relay 570 is operated and relay 575 released long enough for relay 596 to be released. The release of relay 105 connects ground to the lower winding of relay 104, to decrease the resistance in the circuit through conductor 103 to cause the lighting of the supervisory lamp SL2 associated with plug P2 of cord CD in the manner described in the aforementioned King et al. patent. The calling operator is thus given an "on-hook" signal. When relay 534 releases at the end of the current of frequency F3, relays 535, 537 and 550 release. The release of relay 537 releases relay 570; and the release of relay 570 causes the release of relay 580 and reoperation of relay 575. With both of relays 595 and 596 released, and relay 547 being normal, relay 590 cannot reoperate after relay 575 releases; and, therefore, relays 595 and 105 are not reoperated at the end of the signal. The release of relay 580 connects the charged condenser 581 in series with the winding of relay 585 to reoperate relay 585 for about .550 second. The operation of relay 585, due to the release of relay 580, maintains the release of cutoff relay 425 for about .550 second after the "on-hook" signal ends.

When the calling operator disconnects plug P2 from jack J2 to release the connection, relay 104 releases causing the successive release of relays 133 and 110. Relay 110 releases relays 140, 124 and 136 and also releases relays 105 and 157, if operated. Relay 124 releases relays 112 and 120. Relay 136 releases relay 151 and also relay 152, if operated. The release of relay 112 extinguishes the busy lamp L2; and the release of relay 120 reconnects the signaling conductor 167 through resistors 121 and 122 to the windings of retard coil 160. The release of relay 140 causes the release of relays 431, 433 and 435 of signal transmitter ST1, thereby effecting the transmission of a disconnect signal consisting of current of frequency F2 for about .030 second followed by current of frequency F1 in the same manner as that in which the first impulse of a train of dial impulses is transmitted over line T12 as hereinbefore described. The current of frequency F1 continues for about .750 second, that is, until both of relays 432 and 434 release, whereupon the connection between conductor 450 and coil 429 is opened. In the signal receiver SR2 the current of frequency F2 effects the operation of relay 744 of signal receiver SR2. The operation of relay 744 causes the operation of relay 745; but relay 735 being normal, relays 747 and 750 do not operate. When the current of frequency F2 ends, relay 744 releases, relay 745 remaining operated for about .020 second. The current of frequency F1 causes the operation of relay 734. The operation of relay 734 causes the operation of relay 735; and, since relay 745 has not yet released, it also causes the operation of relays 737 and 750. The operation of relay 750 causes the release of relay 625. Relay 737 connects ground to conductor 739, thereby causing the energization of the upper winding of relay 770. Relay 770 opens the circuit through the upper winding of relay 775, the deenergization of this winding being delayed for about .020 second while condenser 771 is being charged. Relay 775 connects ground to conductor 794 to reverse the current through the lower winding of relay 790. Relay 790 opens the circuit through relay 795, conductor 970, relays 805 and 1005 causing the release of relays 795, 805 and 1005. Since the current of frequency F1 continues for about .750 second, relays 796 and 807 also release. When the current of frequency F1 ceases, relay 734 releases causing the release of relays 735, 737 and 750. The release of relay 750 closes the circuit for operating relay 625. The release of relay 737 disconnects ground from conductor 739 thereby restoring relays 770 and 775 to normal. The release of relay 807 of two-way trunk circuit TWT2 disconnects ground from conductor 853 thereby releasing relay 799 of the signal receiver SR2, releasing relay 860 of selector TS2, and releasing relay 803 of trunk circuit TWT2. The release of relay 799 completes the return of signal receiver SR2 to normal. The release of relay 860 closes a circuit for operating release magnet 868 and selector TS2 is thereupon restored to normal in well-known manner. The release of relay 803 completes the return of trunk circuit TWT2 to normal, disconnecting ground from conductors 823 and 968 to terminate the guarding of the terminals to which trunk circuit TWT2 is connected in the banks of toll selectors and to cause the release of relay 906. The release of relay 906 disconnects battery from the sleeve of jack J9 and causes the release of relay 912. The release of relay 912 extinguishes busy lamp L9 and completes the return of the outgoing trunk circuit OT2 to normal.

The aforementioned release of relay 1005 connects relay 1008 to conductor 1003, relay 1008 closes the circuit for operating relay 1014, and relay 1014 locks. Relay 1008 releases as soon as ground is disconnected from conductor 1003 by the aforementioned release of relay 807; and, since relay 1005 does not reoperate, the supervisory lamp (not shown) of the cord connected to jack J10 lights as a disconnect signal. The aforementioned disconnection of ground from conductor 1003 also causes the release of the slow-to-release relay 1031. When relay 1031 releases, and if the answering operator has not disconnected from jack J10, conductor 1003 is connected to ground at the uppermost front contact of relay 1034 to prevent the reseizure of trunk circuit IT2. When the answering cord is disconnected from jack J10, relays 1044 and 1014 release. The release of relay 1034 completes the return of trunk circuit IT2 to normal.

Assume now the selector TS2 is operated to select the level represented by terminals 875, in which level the terminals are connected to combined intertoll and toll transmission selectors such as the selector CS connected to terminals 875. Assume further that the selector CS is selected by the trunk-hunting operation of selector TS2. The line relay 1121 of selector CS is thereupon operated in a circuit which includes conductors 1101 and 1102 in parallel, thence through selector TS2, to ground at the front contact of signaling relay 790 as hereinbefore described. Relay 1121 closes a circuit for operating slow-to-release relay 1122. When the calling operator dials the next digit of the toll route number, the impulses are transmitted over line T12 to signal receiver SR2 and repeated to relay 1121. The brushes of selector CS are thereby advanced to select a corresponding level and an unguarded set of terminals therein. References may be had to the aforementioned copending application of P. W. Wadsworth for a complete description of the operation of selector CS. When an unguarded set of terminals is encountered relay 1130 operates, connecting the right windings of repeating coil RC through front contacts of relay 1130, brushes 1131 and 1132 to the toll connector TC; and, with relay 1107 operated in the manner described in the aforementioned P. W. Wadsworth application, resistor 1106 is bridged across the right windings of repeating coil RC to operate line relay 1151 of toll connector TC. Relay 1151 closes a circuit for operating slow-to-release relay 1152; and relay 1152 locks through a back contact of relay 1157, a back contact of relay 1158, brush 1133, a front contact of relay 1130, to ground at a front contact of relay 1122. When the tens digit of the called subscriber's number is dialed, the impulses are transmitted over line T12 and repeated by relays 790 and 1121 to relay 1151. The release of relay 1151 in response to the first impulse closes a circuit for operating slow-to-release relay 1153 and vertical stepping magnet 1154 in series. The operation of stepping magnet 1154 steps the brushes up to the first level. Vertical off-normal springs VON are actuated when the shaft on which the brushes are mounted moves out of normal position, thereby changing the circuit for operating relay 1153 and stepping magnet 1154 to include the front contact of relay 1153 and upper front contact of the VON springs instead of the normally closed contact of the VON springs. When relay 1151 reoperates at the end of the first impulse, stepping magnet 1154 releases; but relay 1153 remains operated until all the impulses in the train have been received. The release of relay 1151 in response to each succeeding impulse of the train reoperates stepping magnet 1154 thereby advancing the brushes of switch TC to the level corresponding to the digit dialed. When relay 1153 releases, at the end of the train, it connects the windings of relay 1155 and rotary stepping magnet 1156 to the back contact of relay 1151. When the calling operator dials the last digit of the called subscriber's number, the impulses are transmitted over line T12 and repeated by relays 790 and 1121 to relay 1151. The release of relay 1151 in response to the first impulse causes the operation of relay 1155 and rotary stepping magnet 1156 to advance the brushes into engagement with the first set of terminals in the selected level. When relay 1151 reoperates at the end of the impulse, stepping magnet 1156 releases; but relay 1155 is slow in releasing and remains operated until all of the impulses in the train have been received. The release of relay 1151 in response to each succeeding impulse of the train reoperates stepping magnet 1156 to advance the brushes into engagement with the terminals of the called subscriber's line. While relay 1155 is operated, the winding of busy test relay 1157 is connected to brush 1163; and, if the called line is busy, relay 1157 is operated by the ground potential encountered by brush 1163. If, however, the called line is idle, relay 1157 does not operate; and, when relay 1155 releases, a circuit is closed for operating the cut-off relay 1172 of the called line in series with the upper winding of relay 1158. Relay 1158 operates and it locks through its lower winding to ground at the front contact of relay 1122. Ringing is effected and the talking connection established when the call is answered, in the manner described in the aforementioned Butz patent. When relay 1158 operates, relay 1107 is released and relay 1112 operated, in the manner described in the aforementioned Wadsworth application; whereby battery and ground are connected through the windings of relay 1120 to the right windings of repeating coil RC; and condenser 1111 is connected across the left windings of repeating coil RC to complete a talking circuit through the repeating coil between toll line T12 and the called subscriber's line. The operation of relay 1120 connects ground to conductor 1104 to operate relays 811, 631, 633 and 635 to effect the transmission of an "off-hook," answering supervisory signal to the calling operator. The connection is maintained until the calling operator disconnects; whereupon a disconnect signal is transmitted over line T12 to effect the release of selector TS2 in the manner hereinbefore described. Relay 1151 releases when relay 790 is released and causes the release of relay 1122. The release of relay 1122 effects the return of selector CS to normal and disconnects holding ground potential from the terminal engaged by brush 1133, thereby causing the release of relays 1158 and 1152. With relays 1151, 1152 and 1158 released, the release magnet 1159 operates to restore the connector switch TC to normal.

If the called line is busy and relay 1157 operates before relay 1155 releases at the end of the last impulse of the units digit, the release of relay 1155 closes a locking circuit for relay 1157 including the upper winding of relay 1158. Relay 1158 is thereby energized sufficiently to close its inner lower front contact and the energization of the lower winding of relay 1158 fully operates all of the contacts and holds the relay operated through brush 1133 to ground at the front contact of relay 1122. Relay 1107 of selector CS is thereby released and relay 1112 is operated as hereinbefore described to close a talking connection through repeating coil RC. The operation of relay 1157 prevents completion of a talking connection with the busy line and closes a circuit from interrupter 1165, through the outer upper front contact of relay 1157, front contacts of relays 1152 and 1158, brush 1132, a front contact of relay 1130, front contact of relay 1121, lower right winding of repeating coil RC, front contact of relay 1112, through the upper winding of relay 1120. Relay 1120 is therefore alternately operated and released 120 times per minute under control of interrupter 1165 and a busy tone is transmitted from tone source 1166 through repeating coil RC back to the calling operator. Each operation of relay 1120 connects ground to conductor 1104 thereby causing the alternate operation and release of relay 811 of two-way trunk circuit TWT2; and relay 811 causes the alternate operation and release of relays 631, 633 and 635 of signal transmitting circuit ST2. The signal transmitting circuit is thereby caused to send in the manner hereinbefore described an "off-hook" signal consisting of current of frequency F3 followed by current of frequency F4 each time relays 631, 633 and 635 operate; and to send in the manner hereinbefore described an "on-hook" signal consisting of current of frequency F4 followed by current of frequency F3 each time relays 631, 633 and 635 release.

The signal receiving circuit SR1 responds to each "off-hook" signal to effect the operation of relay 105 and responds to each "on-hook" signal to effect the release of relay 105 whereby the supervisory lamp SL2 of cord CD is flashed to signal the calling operator. The busy tone transmitted from busy tone source 1166 will be heard by the operator if the talking key associated with cord CD is operated.

When the calling operator withdraws plug P2 from jack J2 to release the connection, a disconnect signal is transmitted over toll line T12 to effect the successive operations of relays 744 and 743, and the release of relays 795, 895 and 1121 in the manner hereinbefore described. Since the disconnect signal is transmitted over line T12 to the signal receiver SR2 while the busy flash signal and busy tone are being transmitted over toll line T12 to the receiver SR1, there may be interference in that the current of frequencies other than the signaling frequencies which are transmitted through conductors 701 and 702 to receiver SR2 or which are transmitted through conductors 501 and 502 to receiver SR1 effect a reduction of the signaling frequency components in the output circuits of the volume limiting amplifiers 725 and 525 respectively. Since the busy tone currents will be of high enough amplitude in the conductors of toll line circuit TLC2 to satisfactorily effect the transmission of the tone over the line T12 to the calling operator, and the disconnect signaling currents incoming to receiver SR2 have been attenuated in being transmitted over line T12, the relative level of the busy tone and signaling currents in the input to volume limiting amplifier 725 may be such as to prevent the operation of relays 744 and 743 and thereby prevent release of the connection. To obviate such trouble, relay 780 is operated each time relay 631 releases, and is released each time relay 631 operates, under the control of the busy interrupter 1165. Each operation of relay 780 causes the operative energization of the upper winding of relay 785 for about .550 second while condenser 781 is discharging; and each release of relay 780 causes the operative energization of the upper winding of relay 785 for a like period, while condenser 781 is discharging. During the transmission of busy flashes over toll line T12, that is alternate "off-hook" and "on-hook" signals, relays 785 will be held operated continuously and therefore relay 625 will remain released so that the busy tone does not reach the talking conductors of line circuit TLC2 and cannot interfere with the operation of relays 734 and 744 of signal receiver SR2 in response to the disconnect signal. Since the first operation of relay 780 does not occur until after the sending of the first "off-hook" signal relay 785 will not be operated by the transmission of an answering signal and the opening of the talking circuit will not be prolonged after the "off-hook" signal has been transmitted. Therefore the talking circuit will be closed for conversation without unnecessary delay, after the "off-hook" signal has been transmitted.

In case the selector CS finds all trunks busy in a selected level, the brushes are advanced to the 11th rotary position and the supervisory relay 811 is alternately operated and released under the control of relay 1120, relay 1120 being alternately operated and released under the control of an interrupter as described in the application of P. W. Wadsworth. While no busy tone source is connected to the talking conductors of selector CS in such a case, the alternate operation and release of relay 1120 generates interference currents which are transmitted through conductors 961 and 962 and toll line T12 and which might be of sufficient amplitude to interfere with the response of receiver SR2 to an incoming disconnect signal; but the above described arrangement for preventing busy tones from interfering with a disconnect signal also prevents interference due to the busy flashing signals received and repeated by relay 1120.

What is claimed is:

1. In a telephone system, a trunk for use in completing talking connections, means at one end of said trunk for transmitting over the trunk signals comprising current impulses of a predetermined frequency characteristic within the voice frequency band, means at the other end of said trunk for receiving and operatively responding to said signals, volume limiting means at said other end of the trunk for preventing an operative response to current having a substantial component differing in character from signaling current of said predetermined characteristic, a link comprising talking conductors connected to said other end of the trunk, a tone source, means for intermittently connecting said tone source to said talking conductors, and means for disconnecting said talking conductors from said other end of said trunk to prevent the tone from interfering with response to a signal incoming over the trunk to said other end of the trunk.

2. In a telephone system, a trunk for use in completing talking connections, means at one end of said trunk for transmitting over the trunk signals comprising current impulses of a first predetermined frequency characteristic within the voice frequency band, means at the other end of said trunk for receiving and operatively responding to said signals, means at said other end of the trunk for transmitting over the trunk signals comprising current impulses of a second predetermined frequency characteristic within the voice frequency band, means at said one end of the trunk for receiving and operatively responding to signals transmitted over the trunk from said other end, volume limiting means at said other end of the trunk for preventing an operative response to current having a substantial component of a character other than said first predetermined characteristic, a link comprising talking conductors connected to said other end of the trunk, a tone source, means for intermittently connecting said tone source to said talking conductors and for intermittently operating the signal transmitting means at said other end of the trunk to transmit signals of said second frequency characteristic over the trunk to said one end, and means for disconnecting said talking conductors from said other end of the trunk to prevent the tone from interfering with response to a signal incoming over the trunk to said other end of the trunk.

3. In a telephone system, lines, a trunk for use in completing talking connections between calling and called lines, means connecting a calling line to one end of said trunk, means at the calling end of said trunk for transmitting over the trunk signals including a disconnect signal comprising current impulses of predetermined frequency characteristics within the voice frequency band, means at the other end of said trunk for receiving and operatively responding to said signals, means at said other end of the trunk for transmitting over the trunk signals including busy signals comprising current impulses of other predetermined frequency characteristics within the voice frequency band, means at the calling end of the trunk for receiving and operatively responding to signals incoming from said other end, volume limiting means at said other end of the trunk for preventing an operative response to current having a substantial component differing in character from the first-mentioned predetermined frequency characteristics, volume limiting means at the calling end of the trunk for preventing an operative response to current having a substantial component of frequencies other than said other predetermined frequency characteristics, a link comprising talking conductors connected to said other end of the trunk for extending the connection toward the called line, a busy tone source, means for intermittently connecting said tone source to said talking conductors and for causing the operation of the signal transmitting means at said other end of the trunk to transmit busy signals over the trunk to the calling end, and means for disconnecting said talking conductors from said other end of the trunk to prevent the tone from interfering with response to a disconnect signal incoming over the trunk to said other end of the trunk.

4. In a telephone system, lines, a trunk for use in completing talking connections between calling and called lines, means connecting a calling line to one end of said trunk means at the calling end of said trunk for transmitting over the trunk signals including a disconnect signal comprising current impulses of predetermined frequency characteristics within the voice frequency band, means at the other end of said trunk for receiving and operatively responding to said signals, means at said other end of the trunk for transmitting over the trunk signals including busy signals comprising current impulses of other predetermined frequency characteristics within the voice frequency band, means at the calling end of the trunk for receiving and operatively responding to signals incoming from said other end, volume limiting means at said other end of the trunk for preventing an operative response to current having a substantial component differing in character from the first-mentioned predetermined frequency characteristics, volume limiting means at the calling end of the trunk for preventing an operative response to current having a substantial component of frequencies other than said other predetermined frequency characteristics, a link comprising talking conductors connected to said other end of the trunk for extending the connection toward the called line, a busy tone source, means for intermittently connecting said tone source to said talking conductors and for causing the operation of the signal transmitting means at said other end of the trunk to transmit busy signals over the trunk to the calling end, and means for disconnecting said talking conductors from said other end of the trunk to prevent the tone from interfering with response to a disconnect signal incoming over the trunk to said other end and to prevent the tone from interfering with response to the busy signals incoming over the trunk to the calling end of the trunk.

5. In a telephone system, lines, a trunk for use in completing talking connections between calling and called lines, means connecting a calling line to one end of said trunk, means at the calling end of said trunk for transmitting seizure, directive and disconnect signals over said trunk, each of said signals comprising current impulses of predetermined frequency characteristics within the voice frequency band, means at the other end of said trunk for receiving and operatively responding to said signals, means at said other end of the trunk for transmitting over the trunk signals including busy signals comprising current impulses of other predetermined frequency characteristics within the voice frequency band, means at the calling end of the trunk for receiving and operatively responding to signals incoming over the trunk from said other end, volume limiting means at said other end of the trunk for preventing an operative responsive to current having a substantial component differing in character from said first-mentioned frequency characteristic, means including a selector switch having access to a plurality of lines for connecting said other end of the trunk to the called line, a tone source, means effective if the called line is busy for intermittently connecting said tone source to the talking conductors of said selector and for causing the signal transmitting means at said other end of the trunk to transmit busy signals over the trunk, and means for disconnecting the talking conductors of said selector from said trunk while said tone source is connected to said talking conductors thereby to prevent the tone from interfering with response to a disconnect signal incoming over the trunk to said other end of the trunk.

6. In a telephone system, lines, a trunk for use in establishing talking connections between calling and called lines, means connecting a calling line to one end of said trunk, means at the calling end of said trunk for transmitting signals over the trunk, each of said signals consisting of a current impulse of one of two signaling frequencies followed by a current impulse of the other of said two frequencies, means at the other end of said trunk for receiving and operatively responding to said signals, means including volume limiting means at said other end of the trunk for preventing an operative response to current having a substantial component differing in character from said signaling currents, means at said other end of the trunk for transmitting signals over the trunk, each of the last-mentioned signals consisting of a current impulse of one of two other signaling frequencies followed by a current impulse of the other of said two other frequencies, means at the calling end of the trunk for receiving and operatively responding to signals transmitted over the trunk from said other end of the trunk, a link comprising talking conductors connected to said other end of the trunk, a tone source, means intermittently connecting said tone source to said talking conductors, and means for disconnecting said talking conductors from said trunk to prevent the tone from interfering with response to a signal incoming over the trunk to said other end of the trunk.

7. In a telephone system, lines, a trunk for use in establishing talking connections between calling and called lines, means connecting a calling line to one end of said trunk, means at the calling end of said trunk for transmitting signals over the trunk, each of said signals consisting of a current impulse of one of two signaling frequencies followed by a current impulse of the other of said two frequencies, means at the other end of said trunk for receiving and operatively responding to said signals, means including volume limiting means at said other end of the trunk for preventing an operative response to current having a substantial component differing in character from said signaling currents, means at said other end of the trunk for transmitting signals over the trunk, each of the last-mentioned signals consisting of a current impulse of one of two other signaling frequencies followed by a current impulse of the other of said two other frequencies, means at the calling end of the trunk for receiving and operatively responding to signals transmitted over the trunk from said other end of the trunk, a link comprising talking conductors connected to said other end of the trunk, a tone source, means intermittently connecting said tone source to said talking conductors and for operating the signal transmitting means at said other end of the trunk, and means for disconnecting said talking conductors from said trunk while said tone is connected to said conductors.

HENRY E. VAUGHAN.